(12) United States Patent
Al-Amri

(10) Patent No.: US 12,368,404 B2
(45) Date of Patent: Jul. 22, 2025

(54) DUAL-FUNCTION RACKING STRUCTURE FOR NATURAL COOLING OF PHOTOVOLTAIC PANELS

(71) Applicant: Imam Abdulrahman Bin Faisal University, Dammam (SA)

(72) Inventor: Fahad Gallab Al-Amri, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 96 days.

(21) Appl. No.: 18/155,794

(22) Filed: Jan. 18, 2023

(65) Prior Publication Data
US 2024/0243690 A1   Jul. 18, 2024

(51) Int. Cl.
  H02S 20/10   (2014.01)
  H02S 40/36   (2014.01)
  H02S 40/42   (2014.01)

(52) U.S. Cl.
  CPC .............. *H02S 20/10* (2014.12); *H02S 40/36* (2014.12); *H02S 40/42* (2014.12)

(58) Field of Classification Search
  CPC .................................. H02S 20/10; H02S 40/42
  See application file for complete search history.

(56) References Cited

U.S. PATENT DOCUMENTS

| | | | | |
|---|---|---|---|---|
| 4,056,405 A | * | 11/1977 | Varadi | H02S 40/44 136/246 |
| 5,143,556 A | * | 9/1992 | Matlin | F24S 25/12 136/251 |
| 5,614,033 A | * | 3/1997 | Robinson | H01L 31/048 136/246 |
| 7,900,407 B2 | | 3/2011 | Plaisted | |
| 2007/0295382 A1 | * | 12/2007 | Oak | F24S 25/00 136/244 |
| 2009/0095284 A1 | | 4/2009 | Klotz | |
| 2010/0132767 A1 | * | 6/2010 | Miyamoto | H02S 20/22 136/251 |

(Continued)

FOREIGN PATENT DOCUMENTS

| | | |
|---|---|---|
| CN | 210518200 U | 5/2020 |
| EP | 2 607 816 A1 | 6/2013 |
| EP | 2 775 064 B1 | 12/2017 |

OTHER PUBLICATIONS

"Aluminium Solar Structure—Sheet Based Roof Top Solar Mounting Structure", Hyper Green Renewable Energy Private Limited.

*Primary Examiner* — Sadie White
(74) *Attorney, Agent, or Firm* — Oblon, McClelland, Maier & Neustadt, L.L.P.

(57) ABSTRACT

A photovoltaic panel system including photovoltaic panels, purlins, and a rigid support. The purlins are oriented parallel to one another and are oriented perpendicular to an orientation of horizontal members extending along a length of the PV panel. Each purlin has a flat bottom surface plate and a flat top surface plate, which are lengthwise connected with a vertically oriented plate. The flat bottom surface plate is directly adjacent to the horizontal members. The purlins have a length greater than a width of the PV panels. At least 6 purlins are evenly spaced along the length of the PV panel. The flat top surface plate of each purlin is in thermal contact, via an adhesive, with a back surface of each PV panel.

18 Claims, 26 Drawing Sheets

(56) References Cited

U.S. PATENT DOCUMENTS

| | | | |
|---|---|---|---|
| 2010/0218441 A1* | 9/2010 | Stancel | F24S 25/50 |
| | | | 52/173.3 |
| 2010/0236183 A1* | 9/2010 | Cusson | H02S 20/30 |
| | | | 52/645 |
| 2011/0067749 A1* | 3/2011 | Zuritis | F24S 25/65 |
| | | | 136/246 |
| 2011/0139219 A1* | 6/2011 | Yeh | H02S 30/10 |
| | | | 136/246 |
| 2011/0163051 A1* | 7/2011 | Horanek | F24S 25/13 |
| | | | 211/26 |
| 2012/0085395 A1* | 4/2012 | Kuster | H02S 20/10 |
| | | | 136/251 |
| 2012/0097816 A1* | 4/2012 | Tamm | F24S 25/12 |
| | | | 29/466 |
| 2012/0175322 A1* | 7/2012 | Park | F16B 5/0635 |
| | | | 248/299.1 |
| 2013/0167907 A1* | 7/2013 | Bitarchas | F24S 25/615 |
| | | | 136/251 |
| 2013/0192150 A1* | 8/2013 | DuPont | F24S 25/634 |
| | | | 52/173.3 |
| 2014/0311552 A1 | 10/2014 | Garrett | |
| 2014/0318046 A1 | 10/2014 | Powers, III | |
| 2015/0000725 A1* | 1/2015 | Reilly | F24S 25/70 |
| | | | 136/251 |
| 2015/0090319 A1* | 4/2015 | Mizuo | F24S 25/12 |
| | | | 438/66 |
| 2016/0134231 A1* | 5/2016 | Wu | H02S 20/24 |
| | | | 524/145 |
| 2017/0111006 A1* | 4/2017 | Vietas | H02S 20/24 |
| 2017/0170779 A1* | 6/2017 | Yamashita | H02S 20/30 |
| 2019/0305717 A1* | 10/2019 | Allen | H02S 20/24 |

* cited by examiner

DUAL-FUNCTION RACKING STRUCTURE FOR NATURAL COOLING OF PHOTOVOLTAIC PANELS

STATEMENT REGARDING PRIOR DISCLOSURE BY THE INVENTORS

Aspects of the present disclosure appear in an article "Novel dual-function racking structure for passive cooling of solar PV panels-thermal performance analysis," *Renewable Energy* 198, Oct. 1, 2022, pp 100-113, a copy of which is incorporated herein by reference in its entirety.

BACKGROUND

Technical Field

The present disclosure relates to a photovoltaic (PV) panel and more particularly to a PV panel system including a racking/mounting structure and/or a cooling apparatus.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Currently, several countries have laws and regulations for encouraging establishment of solar installations to provide a non-depletable, clean, and renewable energy source. With the improvement in solar technology, tests conducted in various laboratories have determined that an optimal operating temperature of the photovoltaic (PV) panels is in a range of 20° C. to 30° C., assuming that there will always be a series of losses generated as a result of photovoltaic cells working at temperatures exceeding an optimal temperature, generally between 40° C. and 60° C. due to heating of the PV cells by solar radiation.

Power output (and hence an efficiency) of the PV panels decreases with an increase in temperature. A temperature coefficient (percentage reduction in power per degree Celsius increase in temperature with reference to a standard temperature of 25° C.) of most commercially available PV panels ranges from −0.2%/° ° C. to −0.5%/° C. The increase in temperature of the PV panels depends on multiple external and internal factors, including local solar irradiation on the PV panel. According to a study [See: B. Nehme, N. K. M'Sirdi, T. Akiki, and B. Zeghondy, "Assessing the effect of temperature on degradation modes of PV panels," 2020 5th Int. Conf. Renew. Energies Dev. Countries, REDEC 2020, 2020], an average degradation of the PV panels per degree Celsius increase in the temperature is 1.5%. As such, cooling of the PV panels becomes important in hot climatic conditions, where an optimal operating temperature often crosses 100° C. This causes the PV panels to frequently work below their ideal performance of 100%. Overheating due to the solar radiation results in early deterioration of the PV panels, shortened service life, and hence a lower performance after a few years of operation.

One of the major challenges in the PV industry is to have effective and viable means of cooling the PV panels to maintain a temperature within a desired level during operation. Commercially available racking structures are primarily designed to fulfill only a mechanical support requirement.

Research has described active, passive, and hybrid cooling techniques for PV panels. While the active cooling technique includes forced circulation of air, water, or any suitable liquid, the passive cooling technique includes natural heat dissipation from the PV panels by means of air or any suitable fluid, phase change materials (PCM), heat pipe, refrigerant, or metallic heat sink. Other techniques, such as evaporative cooling, radiant cooling, and thermoelectric cooling, have also been described. The hybrid cooling technique suitably incorporates both the passive cooling technique and the active cooling technique. Recently, Li et al. [See: R. Li, Y. Shi, M. Wu, S. Hong, and P. Wang, "Photovoltaic panel cooling by atmospheric water sorption-evaporation cycle," Nat. Sustain., vol. 3, pp. 636-643, 2020] has introduced an atmospheric water harvesting (AWH) system, which absorbs water vapor from atmospheric air at night by means of a specially designed hydrogel and evaporates it during the day by absorbing heat from the PV panels. However, most of these techniques are currently at the exploratory phase, and a lot of challenges need to be addressed to demonstrate their commercial viability. The major challenges include technical feasibility of installation, operational complexity, affordability, maintenance, reliability, and sustainability.

Although heatsinks are known to reduce temperature of a component by absorption of heat from the component and losing heat to the atmosphere, solutions that eliminate the heatsink may be preferred and may help provide simpler and cheaper passive cooling techniques, due to cost of installation of the heatsinks in the PV panels. Few studies have proposed modifications to the PV panel and a frame thereof. For instance, Hernandez-Perez et al. [See: J. G. Hernandez-Perez, J. G. Carrillo, A. Bassam, M. Flota-Banuelos, and L. D. Patino-Lopez, "A new passive PV heatsink design to reduce efficiency losses: A computational and experimental evaluation," Renew. Energy, vol. 147, pp. 1209-1220, 2020] experimented the idea of perforating the PV panel by drilling holes to enhance passive cooling and achieved a reduction of 16° C. with a hole density of 23 holes/m$^2$. Hernandez-Perez et al concluded that there existed an optimum hole diameter and density for enhanced cooling performance. Nižetić et al. [See: S. Nižetić, I. Marinić-Kragić, F. Grubišić-Cabo, A. M. Papadopoulos, and G. Xie, "Analysis of novel passive cooling strategies for free-standing silicon photovoltaic panels," J. Therm. Anal. Calorim., vol. 141, no. 1, pp. 163-175, 2020] conducted simulation study on perforating the frame, changing material of the frame, and perforating the PV panel by providing slits instead of holes. Perforating the PV panel showed the best performance (reduction of 4° C.), while an impact of the other two methods was not significant. However, it will be apparent that these techniques need further detailed analysis in terms of structural performance, manufacturability, and affordability.

Another challenge in PV systems is with respect to structural integrity, e.g., the ability to withstand dynamic loads, such as wind. Excessive mechanical load fluctuations can cause the PV panels to deform over time and generate micro-cracks resulting in a decline in efficiency and power output. Studies on the potential damages, such as micro-cracks, on the PV panels caused by environmental effects are known.

Therefore, current attempts to avoid temperature based decreases in PV panel performance have been unsuccessful primarily due to a fact that even though there are cooling systems capable of controlling panel heating effect, the economic and energy cost thereof is generally high.

Accordingly, it is one object of the present disclosure to provide an economical dual-function PV panel racking structure that concurrently functions as a heat sink.

SUMMARY

According to one aspect of the present disclosure, a photovoltaic panel system is provided. The photovoltaic panel system includes a plurality of photovoltaic panels, a plurality of purlins, and a rigid support. The rigid support includes at least two first vertical members, each first vertical member having a first vertical length; at least two second vertical members, each second vertical member having a second vertical length; and at least two horizontal members, each horizontal member having a horizontal length L2. The first vertical length is less than the second vertical length and each horizontal member spans one of the first vertical members and one of the second vertical members to form a first support span. A first horizontal member and a second horizontal member are oriented parallel to one another, and the photovoltaic panel system comprises at least two support spans. The plurality of purlins are oriented parallel to one another and are connected to the first and second horizontal members of the rigid support to span the first and second horizontal members. The plurality of purlins are oriented perpendicular to the orientation of the first and second horizontal members. Each purlin has a flat bottom surface plate and a flat top surface plate. The flat bottom surface plate and the flat top surface plate are lengthwise connected with a vertically oriented plate. The flat bottom surface plate is directly adjacent to portions of top surfaces of the horizontal members. The photovoltaic panels have a length L1 and a width W1, where L1>W1; and the horizontal members have a length L2, where L1>L2. The purlins have a length L3 greater than the width W1 of the photovoltaic panels. At least 6 purlins are evenly spaced along the length L2 of the horizontal member. The flat top surface plate of each purlin is in thermal contact with a back surface of each of the photovoltaic panels of the plurality of photovoltaic panels.

In some embodiments, the purlins are evenly spaced at a distance of 200 mm to 270 mm apart.

In some embodiments, the first vertical members are spaced between 1.5 m and 2.5 m from one another, and the second vertical members are spaced between 1.5 m and 2.5 m from one another.

In some embodiments, each first vertical member is spaced between 1.0 m and 2.0 m from a second vertical member.

In some embodiments, each purlin of the plurality of purlins has one of a C-shaped cross section, an inverted T-shaped cross section, a Z-shaped cross section, or a L-shaped cross section.

In some embodiments, a narrow top edge of the purlin is affixed to a photovoltaic panel, and a wider bottom edge is exposed to atmosphere.

In some embodiments, the plurality of photovoltaic panels is evenly spaced on the purlins and each purlin is separated from a neighboring purlin by a distance of 0.1×W1 to 0.5×W1.

In some embodiments, each photovoltaic panel is fastened to a neighboring panel by a clamp having a first connection portion and a second connection portion, and where the first and second connection portions are separated by a flat spacing element.

In some embodiments, the first connection portion and the second connection portion have a C-shaped cross section with a bottom portion in contact with the back surface of the photovoltaic panel, a top portion in contact with a top surface of the photovoltaic panel, and a side section in contact with an edge of the photovoltaic panel.

In some embodiments, a bolt traverses the flat spacing element of the clamp and a bottom surface of the purlin to fasten the clamp and the photovoltaic panels to the photovoltaic panel system.

In some embodiments, the bolt is disposed at a midpoint between the first and second connection portions of the clamp.

In some embodiments, each photovoltaic panel comprises a frame mounted around a perimeter of the photovoltaic panel.

In some embodiments, the photovoltaic panel system further includes crossbar elements on the back surface of the photovoltaic panels. In some embodiments, the crossbar elements have a cross section in a shape of one of a "C" or an "I".

In some embodiments, the crossbar elements include a long member spanning the length of the photovoltaic panel and having a top surface and a bottom surface; and a short member spanning the width W1 of the photovoltaic panel and having a top surface and a bottom surface.

In some embodiments, the long member and the short member intersect to form a common surface such that the top surface of the long member and the top surface of the short member are coplanar, and the bottom surface of the long member and the bottom surface of the short member are coplanar.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
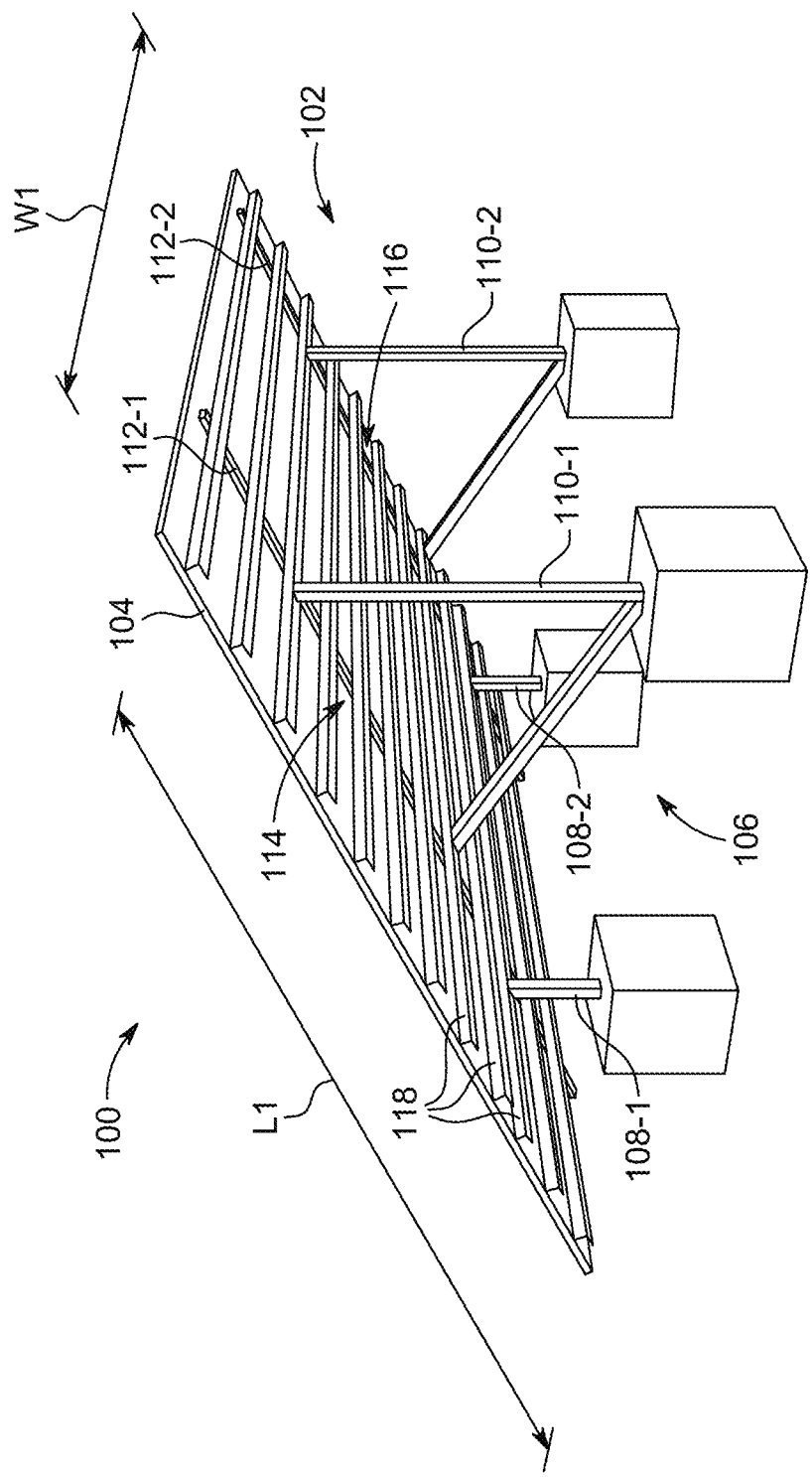
FIG. 1 illustrates a perspective view of a photovoltaic panel system, according to an aspect of the present disclosure.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

FIG. 1 illustrates a perspective view of a photovoltaic panel system 100 (hereinafter referred to as "the system 100"). In particular, FIG. 1 illustrates a racking structure 102 supporting a photovoltaic (PV) panel 104 that includes a plurality of photovoltaic units 302 (see FIG. 3). The PV panel 104 has a length "L1" and a width "W1", where L1>W1. The system 100 includes a rigid support 106 having a first set of vertical members (also referred to as "at least two first vertical members" in the present disclosure and referenced as 108-1 and 108-2), a second set of vertical members (also referred to as "at least two second vertical members" and referenced as 110-1 and 110-2), and at least two horizontal members (references as 112-1 and 112-2). Each vertical member of the first set of vertical members has a first vertical length "V1" (see FIG. 6A), each vertical member of the second set of vertical members 110-1, 110-2 has a second vertical length "V2" (see FIG. 6A), and each horizontal member 112-1, 112-2 has a horizontal length "L2" (Shown in FIG. 6A), such that L1>L2. In some embodiments, the system 100 includes a plurality of PV panels (similar to the PV panel 104) supported by multiple rigid supports 106.

Figure 6A:
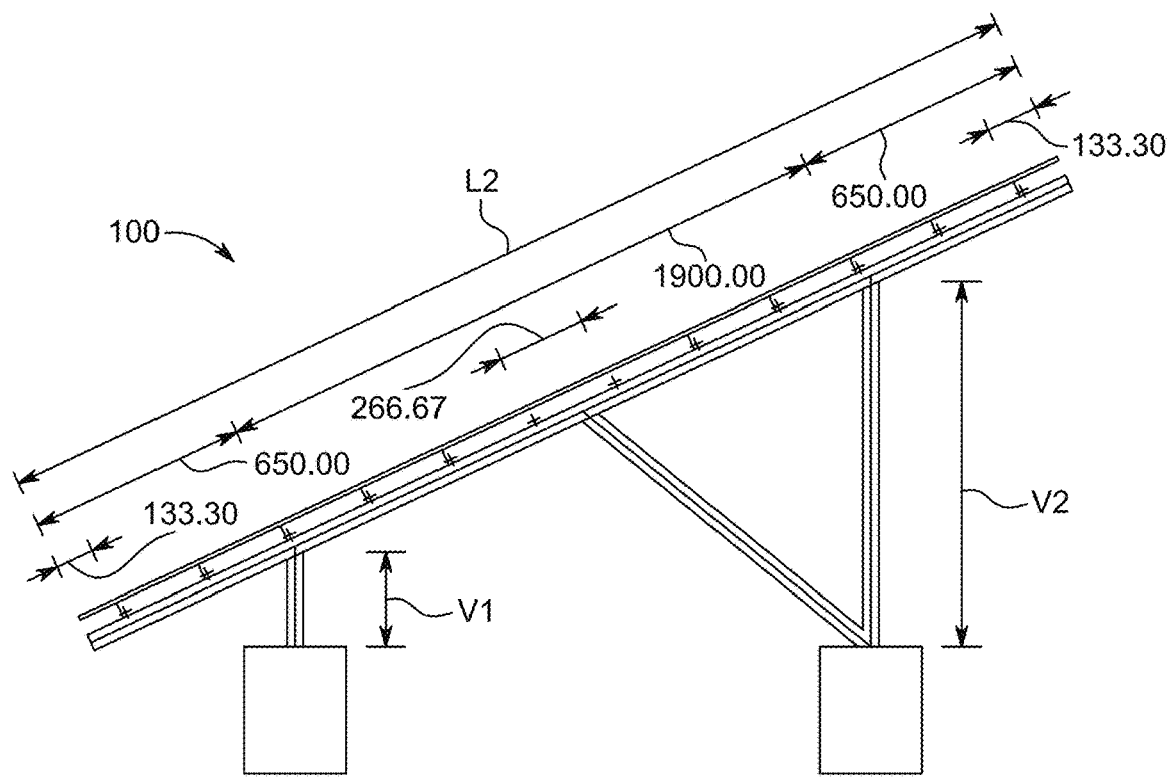
FIG. 6A illustrates a first set of dimensions of the photovoltaic panel system, according to an aspect of the present disclosure.

As seen in FIG. 1 and FIG. 6A, the first vertical length "V1" is less than the second vertical length "V2". In an embodiment, the first vertical length "V1" is 300 mm and the second vertical length "V2" is 1100 mm. Each horizontal member spans one of the vertical members of the first set of vertical members and one of the vertical members from the first set of vertical members to form a support span, and the system 100 includes at least two support spans. For example, a first horizontal member 112-1 spans a first vertical member 108-1 of the first set of vertical members and a first vertical member 110-1 of the second set of vertical members to form a first support span 114. Similarly, a second horizontal member 112-2 spans a second vertical member 108-2 of the first set of vertical members and a second vertical member 110-2 of the second set of vertical members to form a second support span 116. The first horizontal member 112-1 and the second horizontal member 112-2 are oriented parallel to one another.

The system 100 also includes a plurality of purlins 118 connected to and spanning the first horizontal member 112-1 and the second horizontal member 112-2. Each of the plurality of purlins 118 are oriented parallel to one another, and perpendicular to an orientation of the first horizontal member 112-1 and the second horizontal member 112-2.

Figure 2:
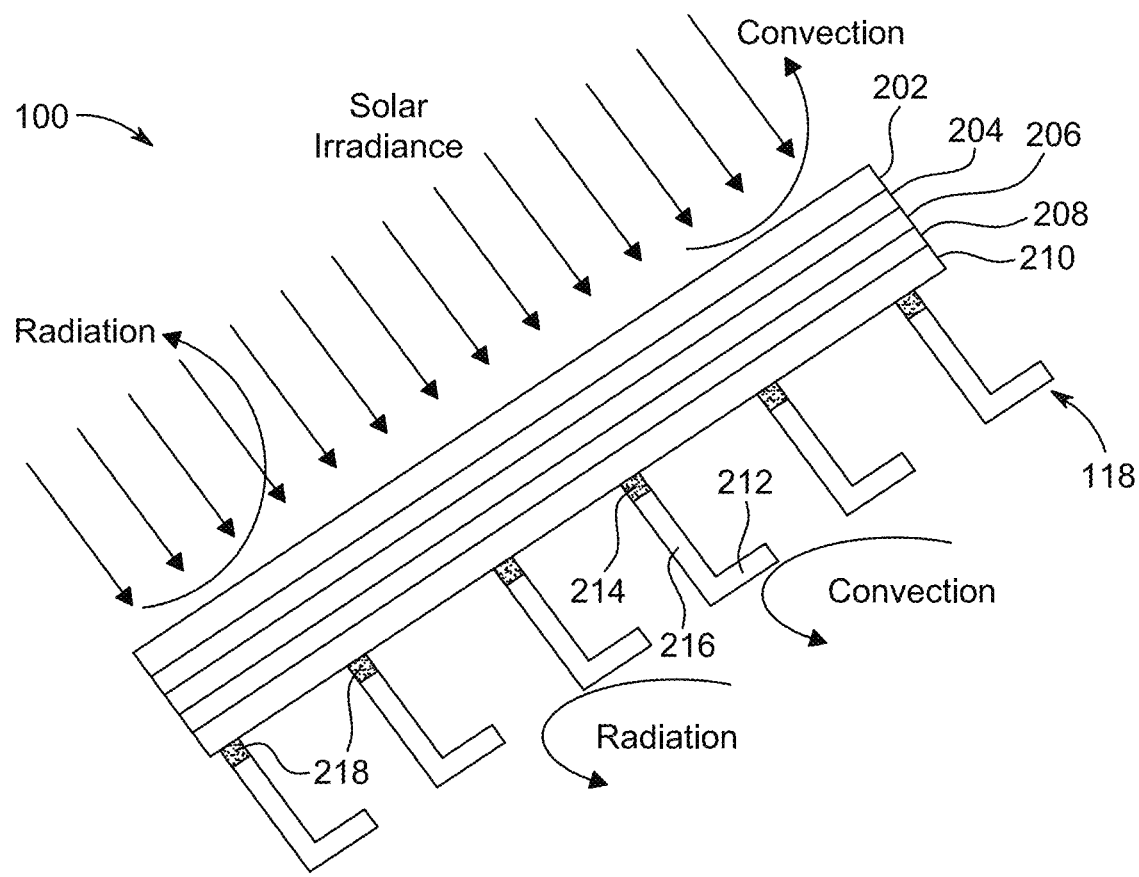
FIG. 2 illustrates an exemplary cross-sectional view of a portion of the photovoltaic panel system of FIG. 1, according to an aspect of the present disclosure.

FIG. 2 is an exemplary cross-sectional view of a portion of the system 100 of FIG. 1, according to an embodiment of the present disclosure. The PV panel 104 includes five layers, such as a first glass layer 202, a first ethylene vinyl acetate (EVA) layer 204, a layer of PV cells 206, a second EVA layer 208, and a second glass layer 210. In addition, a 0.5 mm silicon layer is disposed in-between EVA layers 204, 208. The densities of the constituent materials were 2500 kg/m$^3$, 960 kg/m$^3$ and 2330 kg/m$^3$ for the glass layers 202, 210, the EVA layers 204, 208, and silicon respectively. With aforesaid configuration, the weight of the PV panel 104 was 27 kg. A modulus elasticity of glass is 73000 MPa, and that for the EVA varies between 15 MPa and 80 MPa with used average value of 50 MPa [See: ASCE/SEI 7-16, *Minimum Design Loads and Associated Criteria for Buildings and Other Structures*. American Society of Civil Engineers, Reston, Virginia, 2017]. A utilized modulus of elasticity for silicon is 140000 MPa. For performing an analysis, a transformed section made entirely of glass was employed using the modular ratios of the moduli of elasticities of the constituent materials. Each of the first glass layer 202 and the second glass layer 210 had a thickness of 2.5 mm.

The purlins 118 include a L-shape (angle) cross-section with a dimension of 50 mm×50 mm×2 mm, and at least 6 purlins were provided without increasing a material volume. The purlins were evenly spaced along the length "L2" of the horizontal members 112-1, 112-2. In an embodiment, the purlins 118 may be evenly spaced at a distance of 200 mm to 270 mm apart. In some embodiments, each purlin 118 may be separated from a neighboring purlin by a distance in a range of 0.1×W1 to 0.5×W1. The PV panels 104 are evenly spaced on the purlins 118.

The purlins 118 have a length "L3" (shown in FIG. 6B) greater than the width "W1" of the PV panels 104. In some embodiments, each of the plurality of purlins 118 may have one of a C-shaped cross section, an inverted T-shaped cross section, or a Z-shaped cross section. The structural members of the rigid support 106 were fastened by steel bolts. The rigid support was made of aluminum and was mounted on four concrete footings (as shown in FIG. 1) constructed on the ground. The system 100 has a length of 3 m, a width of 2.90 m and a height varied between 1.75 m and 0.40 m with an angle of inclination of about 25°. The system 100 was installed at a suitable location near Dammam Airport in the Eastern Province of the Kingdom of Saudi Arabia (KSA).

Each purlin 118 has a flat bottom surface plate 212 and a flat top surface plate 214, both lengthwise connected to a vertically oriented plate 216. As may be observed from FIG. 1 and FIG. 2, the flat bottom surface plate 212 is directly adjacent to portions of top surfaces of the horizontal members 112-1, 112-2. Further, the flat top surface plate 214 of each purlin 118 is disposed in thermal contact with a back surface 412 (see FIG. 4) of each of the PV panels 104. As such, a narrow top edge of the purlin 118 is affixed to the PV panel 104 and a wider bottom edge is exposed to atmosphere.

The solar irradiance incident on the PV panel 104 is absorbed firstly by the first glass layer 202. By virtue of the property of the first glass layer 202, heat absorbed thereby is party radiated and partly lost due to convection by wind flowing across the PV panel 104. Further the "L" shaped purlins 118 also help in radiating the heat from the PV panel 104 to the atmosphere besides the convection caused due to the wind flowing across the purlins 118.

Figure 3:
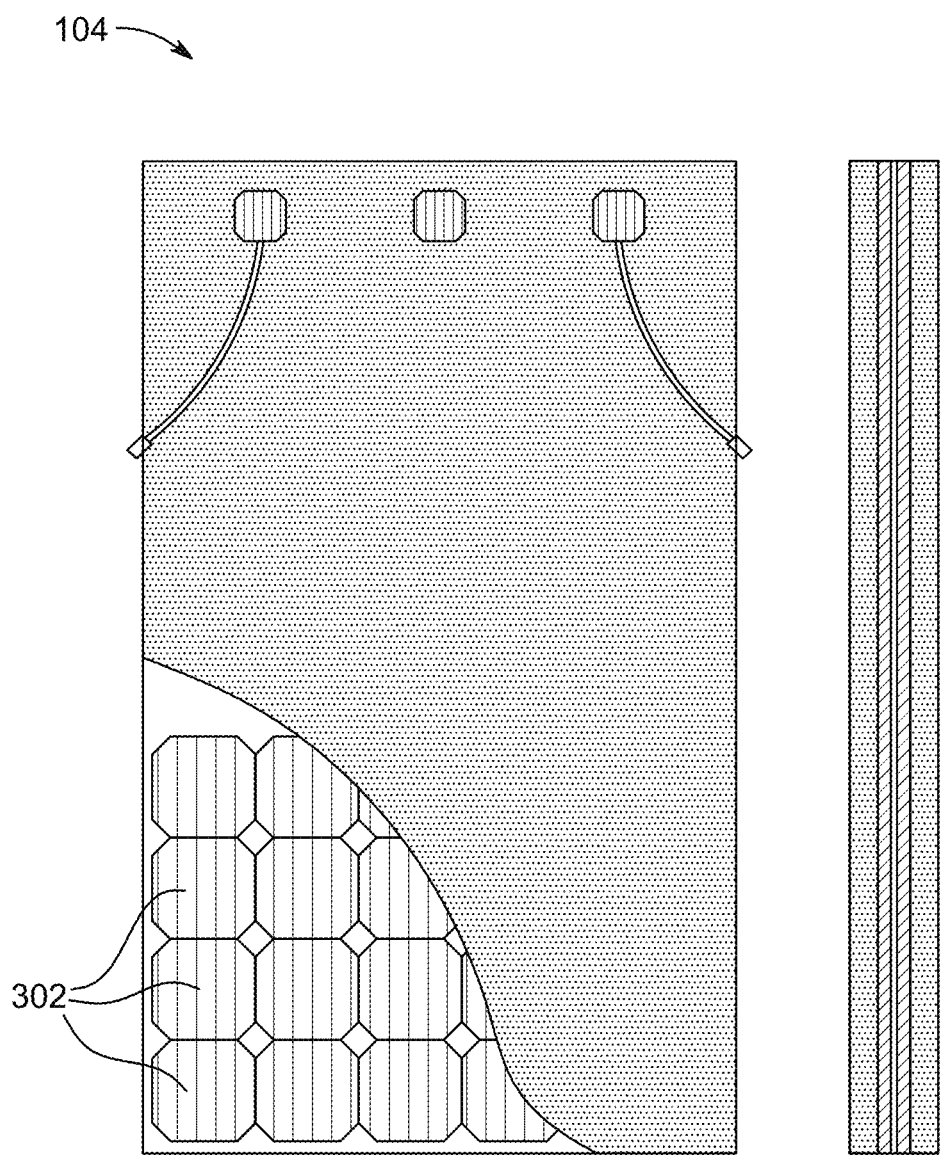
FIG. 3 illustrates a photovoltaic panel of the photovoltaic panel system, according to an aspect of the present disclosure.

FIG. 3 illustrates the PV panel 104, according to an embodiment of the present disclosure. The size of the PV panel 104 was 1658 mm×992 mm×7.5 mm, with a packaging configuration of, for example, 60 pieces per panel arranged in both directions as 6 pieces in short span and 10 pieces in long span. In an embodiment, each PV panel 104 may include a frame (not shown) mounted around a perimeter thereof and may include a plurality of PV units 302.

Figure 4A:
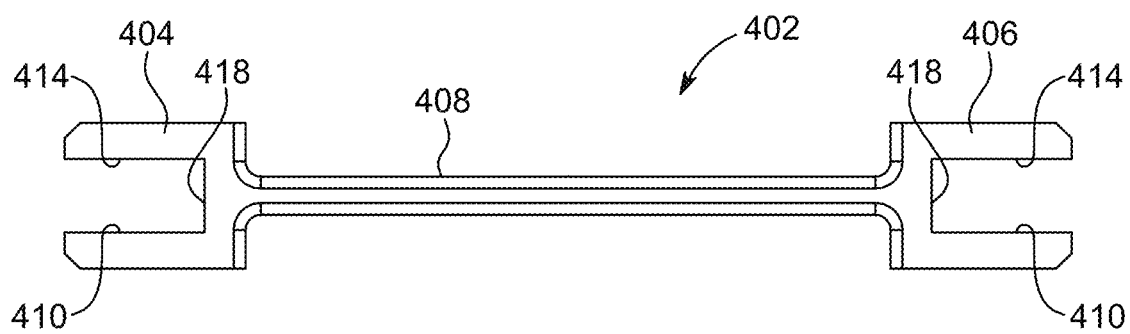
FIG. 4A illustrates a clamp of the photovoltaic panel system, according to an aspect of the present disclosure.
Figure 4B:
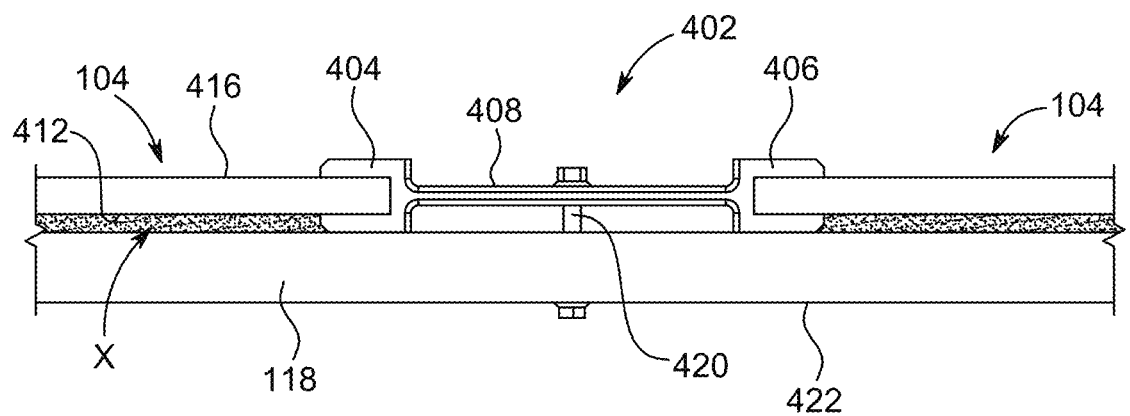
FIG. 4B illustrates an exemplary arrangement using the clamp to couple adjacent photovoltaic panels, according to an aspect of the present disclosure.

FIG. 4A illustrates an exemplary clamp 402 used in the system 100. In an embodiment, each PV panel 104 is fastened to a neighboring PV panel 104 by the clamp 402 having a first connection portion 404 and a second connection portion 406, where a flat spacing element 408 separates the first connection portion 404 and the second connection portion 406, as shown in FIG. 4B. In an embodiment, each of the first connection portion 404 and the second connection portion 406 have a C-shaped cross section, where a bottom portion 410 contacts the back surface 412 of the PV panel 104, a top portion 414 contacts a top surface 416 of the PV panel 104, and a side section 418 contacts an edge of the PV panel 104. In some embodiments, a bolt 420 traverses the flat spacing element 408 of the clamp 402 and a bottom surface 422 of the purlin 118 to fasten the clamp 402 and the PV panels 104. In some embodiments, the bolt 420 is disposed at a midpoint between the first connection portion 404 and the second connection portion 406 of the clamp 402. In some embodiments, a heat absorbing material, such as copper alloy, aluminum alloy, brass, stainless steel and cast iron, may be disposed in a gap "X" to establish the thermal contact between the flat top surface plate 214 of each purlin 118 and the back surface 412 of the PV panel 104.

Figure 5A:
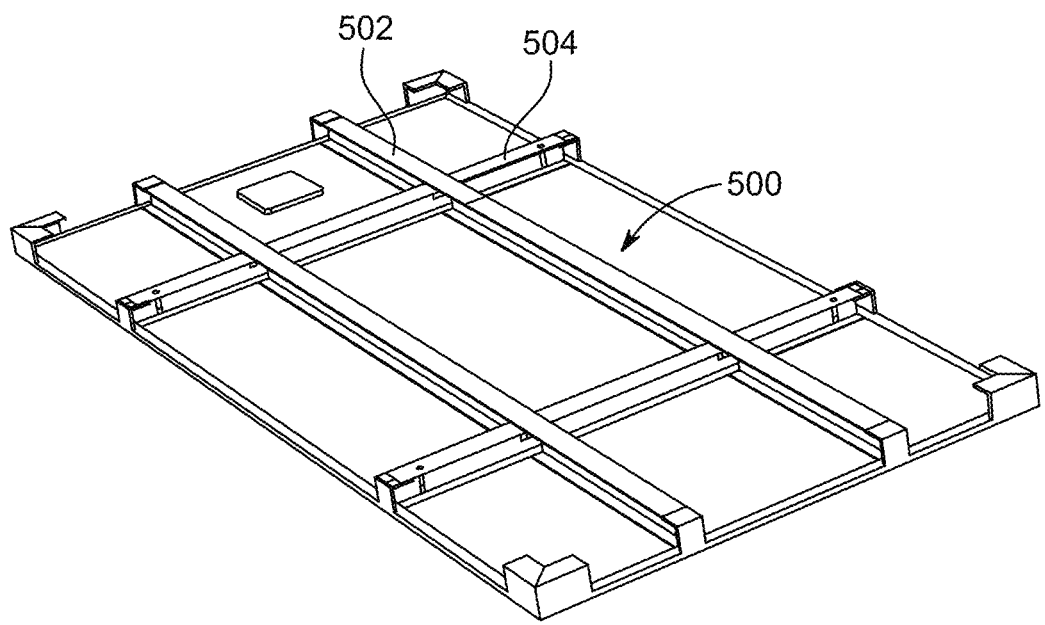
FIG. 5A illustrates crossbar elements of the photovoltaic panel system, according to an aspect of the present disclosure.
Figure 5B:
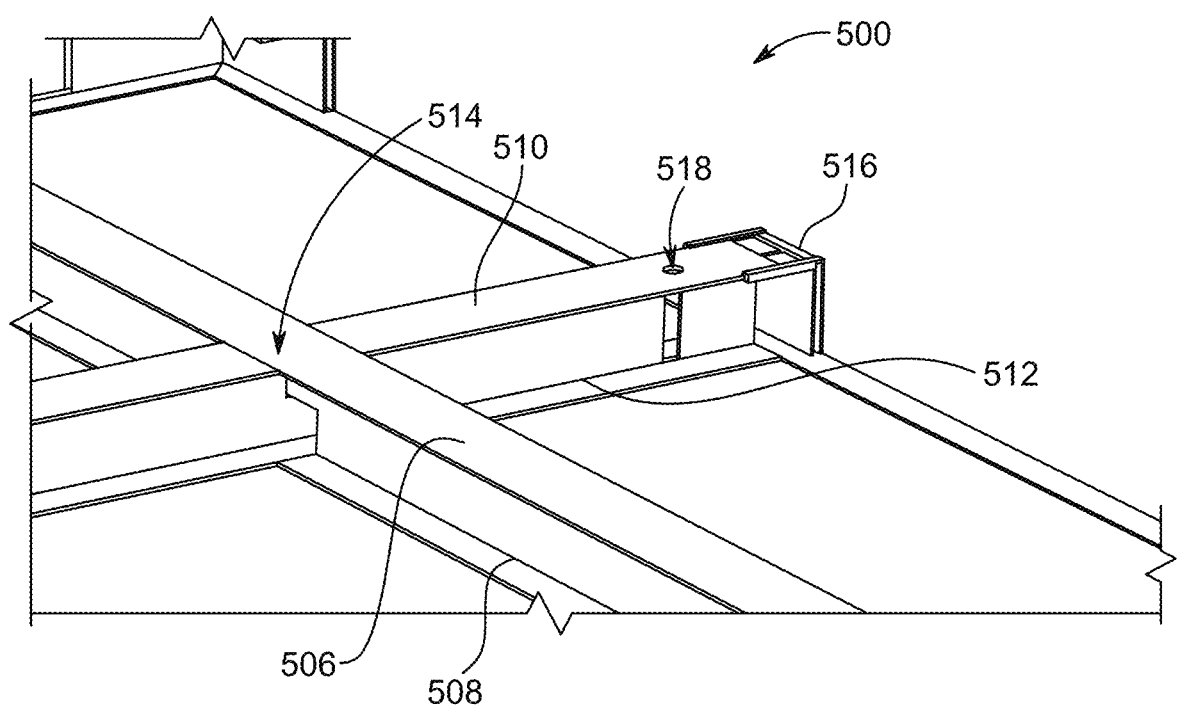
FIG. 5B illustrates an enlarged portion of the crossbar elements of FIG. 5A, according to an aspect of the present disclosure.

FIG. 5A and FIG. 5B illustrates crossbar elements 500 provided on the back surface 312 of the PV panel 104. In an embodiment, the crossbar elements 500 include a long member 502 spanning the length "L1" of the PV panel 104 and a short member 504 spanning the width "W1" of the PV panel 104. As shown in FIG. 5B, the long member 502 has a top surface 506 and a bottom surface 508, and the short member 504 has a top surface 510 and a bottom surface 512. As seen in FIG. 5B, the long member 502 and the short member 504 intersect to form a common surface 514 such that the top surface 506 of the long member 502 and the top surface 510 of the short member 504 are coplanar and, similarly, the bottom surface 508 of the long member 502 and the bottom surface 512 of the short member 504 are coplanar. In some embodiments, the crossbar elements 500 may have one of "C" shaped cross-section or "I" shaped cross-section. In some embodiments, a groove (not shown) may be defined at ends of each of the long member 502 and the short member 504 to allow fixation of the crossbar elements 500 with an aluminum frame 516 which may have extensions that match the end faces of the long and short members. Such a design configuration provides a flat surface where the purlins 118 are attached to the frame 516 without any protrusion which otherwise results in creation of an airgap, e.g., between the purlin and the frame, or thermal resistance. Further, an aperture 518 is defined at the ends of the long member 502 and the short member 504 to allow joining of the PV panel 104 with the crossbar elements (or purlins 118) through fasteners, such as the bolt 420, in addition to the adhesive 218 (such as, silicon paste). In some embodiments, an automatic machine press, such as Spi-Frame Press 4600 may be used to press the crossbar elements 500 and the four corner keys together using hydraulic controls to provide sufficient integrity and cohesion. In an embodiment, the crossbar elements 500 are manufactured with an extrusion process, e.g., the crossbar elements 500 are of unibody construction. In an embodiment, the PV panel 104 includes a lip extending from the back surface of the PV panel in the aluminum frame 516 around a perimeter of the PV panel. The lip preferably covers a edge face of the PV panel and extends backwards from the back surface of the PV panel no more than ½ the height of the crossbar elements. Extensions of the lip may function as end plates for fastening the crossbar securely a back surface of the PV panel 104. Herein, the back surface is the surface of the PV panel 104 that contains the long members 502 and short members 504 on its surface. The lip of the aluminum frame 516 is a perimeter edge or face that extends from a front face of the PV panel 104 to the back surface of the PV panel 104. That is, the long members 502 and short members 504 extends across both the length and width of the PV panel 104, on the back surface of the PV panel 104 with the lip. In an embodiment, a corner clamp is present where the vertical crossbar and the horizontal crossbar of the aluminum frame 516 meet. In an embodiment, the vertical crossbar and the horizontal crossbar of the aluminum frame 516 are also made of aluminum. In an embodiment, there is no air gap between the PV panel 104 and the lip of the aluminum frame 516. In an embodiment, the PV panel 104 has two L-shaped hooks in which the long members 502 attach to positioned on one side of the PV panel 104. In an embodiment, the crossbar elements 500 are attached to the PV panel 104 with a silicon sealant. In an embodiment, two additional L-shaped hooks also attach the short members 504 to the PV panel 104. In an embodiment, the four total L-shaped hooks are made of aluminum. In an embodiment, the short members 504 have a "U" shaped cross section. In an embodiment, the U-shaped beams 504 attach to the L-shaped beams 502 through grooves in the U-shaped beams 504. In an embodiment, each U-shaped beam contains two grooves. In an embodiment, two short members 504 span the width of the PV panel 104 and two long members 502 span the length of the PV panel 104. The design of such a configuration provides the necessary mounting support and compressive strength at the back of the PV panel 104, which will reduce the probability of solar cell cracking. Further, the configuration facilitates effective heat dissipation from the panel surface through the frame structure itself. In an embodiment, the long members 502 and short members 504 lay along the face of the PV panel 104 as to create a tic-tac-toe pattern with nine rectangular segments in three rows of three segments. In an embodiment, the segments in the upper-left corner, upper-right corner, lower-left corner, and lower-right corner are equally sized. In an embodiment, the segments in the upper-left corner, upper-right corner, lower-left corner, and lower-right corner are smaller in length and width than the remaining five segments.

Figure 6B:
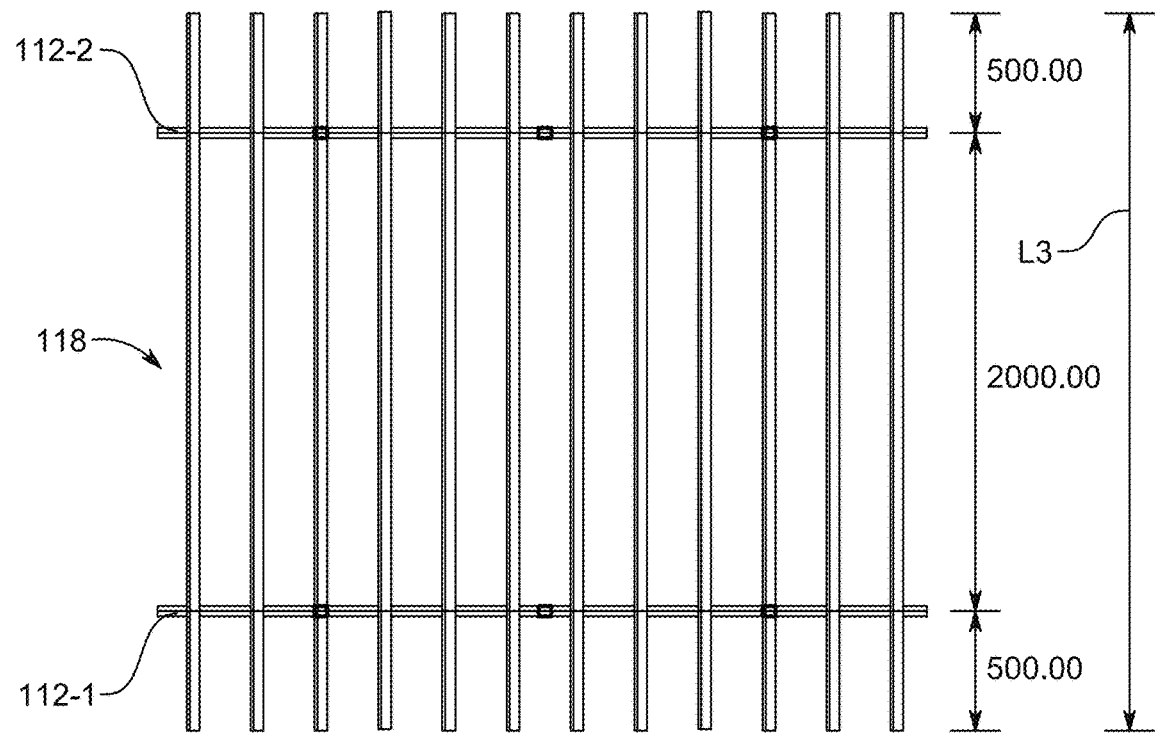
FIG. 6B illustrates a second set of dimensions of the photovoltaic panel system, according to an aspect of the present disclosure.

FIG. 6A and FIG. 6B illustrates various dimensions of the system 100, according to an embodiment of the present disclosure. The system 100 was designed according to a serviceability limit requirement. In an embodiment, each vertical member of the first set of vertical members and the second set of vertical members are spaced in a range of about 1.5 m to about 2.5 m from an adjacent vertical member of corresponding set. In some embodiments, the first vertical member 108-1 of the first set of the vertical members may be spaced at a distance in a range of 1 m to 2 m from the first vertical member 110-1 of the second set of vertical members. In some embodiments, each purlin 118 may have a dimension of 50 mm×50 mm×2 mm.

Hereinafter, experiments carried out and results obtained are discussed. FIG. 7A to FIG. 7D illustrates an exemplary computational domain for flow over a tilted PV panel 104 and domain discretization of the computational domain, according to an aspect of the present disclosure. Multiple studies related to the use of computational tools are known to model the flow around a typical PV panel, such as the PV panel 104, in the presence of incident solar irradiation to study the effect of different cooling mechanisms to improve the efficiency of the PV panel 104 under hot climatic conditions. These studies, however, make use of various surface heat transfer coefficient correlations to determine surface temperatures for a given amount of heat flux incident on the PV panel 104. As reported by Kaplani et al., in their study [See: E. Kaplani and S. Kaplanis, "Thermal modelling and experimental assessment of the dependence of PV module temperature on wind velocity and direction, module orientation and inclination," Sol. Energy, vol. 107, pp. 443-460, 2014], a correct choice of the surface heat transfer coefficient correlations may pose a challenge since the correlations are based on studies carried out under different environmental and operating conditions, as evident from the large differences. In addition, the PV panels 104 are typically oriented along a certain azimuthal direction and tilt based on the azimuthal location and operational requirements. Furthermore, the surface heat transfer coefficient is also influenced by variables such as wind intensity and direction, which can be significantly different depending upon whether the surface of the PV panel 104 is facing leeward or windward side [See: R. J. Cole and N. S. Sturrock, "The convective heat exchange at the external surface of buildings," Build. Environ., vol. 12, no. 4, pp. 207-214, 1977]. Studies have also established that a flat surface with sharp edges, when placed at an angle in a fluid stream, generates streamwise vortices around its edges, creating a lot of turbulence in the flow on a leeward side. If flat surface is the PV panel 104, generated turbulence would enhance the heat transfer and hence the surface heat transfer coefficient.

In order to precisely determine distribution of the surface heat transfer coefficient, numerically modelling the flow around the PV panel 104 under the influence of direct and diffuse solar irradiation may be required. Subsequently, a resulting surface heat transfer coefficient may be used for a more accurate determination of surface temperature of the PV panel 104. An advantage of this approach includes a more accurate determination of the distribution of the direct and diffuse solar irradiation incident on the PV panel 104. The experiment included two steps: (a) the flow around the PV panel 104 was modeled for a given orientation and weather (wind, solar irradiation) conditions; and (b) the PV panel 104 was modeled as a solid structure with different layers having specified material characteristics (as described earlier). A heat transfer analysis of the PV panel 104 was performed subject to the incident solar irradiation, and distribution of the surface heat transfer coefficient was predicted in the first step. The two steps were sequentially implemented by two different modules of a commercial computational fluid dynamics (CFD) software—Ansys Fluent including a fluid flow module Fluent and a heat transfer module Steady-State Thermal. To validate experiment, predicted values of temperature of frontside and backside of the PV panel 104 were compared with experimentally observed values.

The Ansys Fluent module numerically solves the conservation of mass, momentum, and energy equations in a segregated or coupled manner. The mass, momentum and energy conservation equations for a steady, three-dimensional flow are given by:

$$\text{Mass: } \nabla \cdot (\rho \vec{V}) = 0 \quad \text{[Equation 1]}$$

$$\text{Momentum: } \nabla \cdot (\rho \vec{V} \vec{V}) =$$
$$-\nabla p + \nabla \cdot \mu \left( \nabla \vec{V} + \nabla \vec{V}^T - \frac{2}{3} \nabla \cdot \vec{V} I \right) + \rho \vec{g} \quad \text{[Equation 2]}$$

$$\text{Energy: } \nabla \cdot \{\vec{V}(\rho E + p)\} = \nabla \cdot \left( k_{\text{eff}} \nabla T - \sum_j h_j \vec{J}_j + \overline{\overline{\tau}}_{\text{eff}} \cdot \vec{V} \right) \quad \text{[Equation 3]}$$

where, the first three terms on the right-hand side of equation [3] represent energy transfer due to conduction, species diffusion, and viscous dissipation, respectively.

The solver chosen in the experimental study was 3D coupled implicit solver, which iteratively solves the conservation equations till the desired convergence criteria are met. For closure of a turbulence model, additional transport equations were employed. In experimental study, a transition shear-stress transport (SST) model [See: F. R. Menter, R. B. Langtry, S. R. Likki, Y. B. Suzen, P. G. Huang, and S. Völker, "A correlation-based transition model using local variables—Part I: Model formulation," J. Turbomach., vol. 128, no. 3, pp. 413-422, 2006] was used. In the STT model, equations are coupled with additional transport equations for the intermittency and transition onset criteria in terms of momentum-thickness Reynolds number along with an empirical correlation to cover the standard bypass transition for flows in low freestream turbulence environments. In addition, a solar load model in Ansys Fluent was used to specify the direct and diffuse components of solar irradiation on the PV panel 104.

Figure 7A:
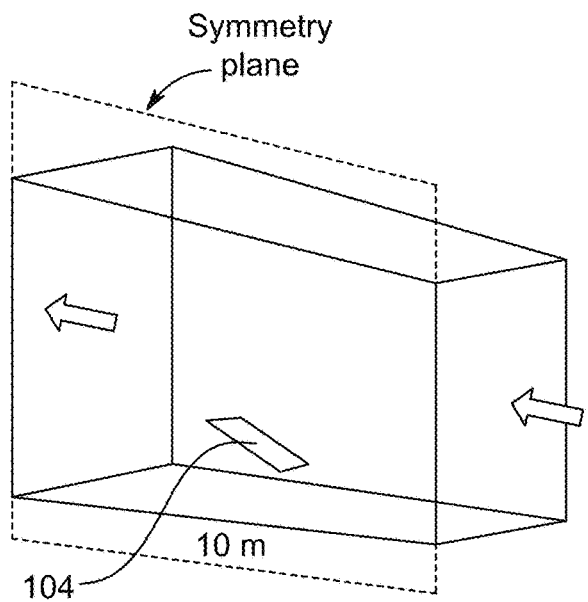
FIG. 7A illustrates a perspective view of an exemplary computational domain for flow over a tilted photovoltaic panel, according to an aspect of the present disclosure.
Figure 7B:
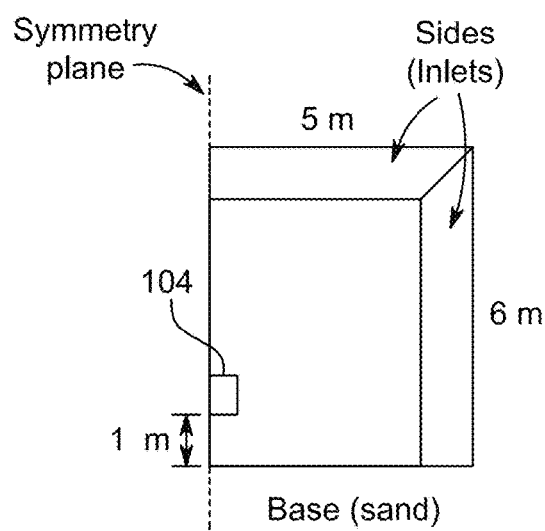
FIG. 7B illustrates a view facing an inlet of an exemplary computational domain for flow over a tilted photovoltaic panel, according to an aspect of the present disclosure.
Figure 7C:
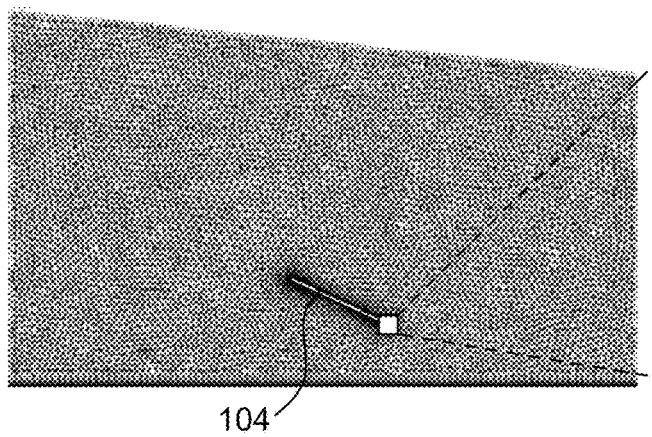
FIG. 7C illustrates a domain side view of domain discretization using hybrid grid, according to an aspect of the present disclosure.
Figure 7D:
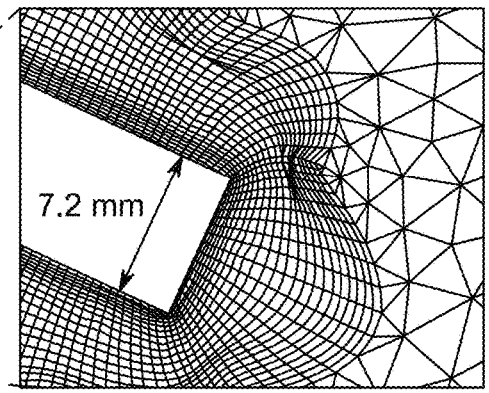
FIG. 7D illustrates an enlarged view of structured grid around a leading edge of the photovoltaic panel, according to an aspect of the present disclosure.

The Ansys Fluent's Design Modeler was used to build a symmetrical half of a computational domain housing the PV panel 104 (measuring 1.658 mm×992 mm×7.2 mm) with a 25° tilt with respect to the ground, as shown in FIG. 7A. The computational domain was discretized using a hybrid mesh scheme. A highly structured grid was chosen around the PV panel 104 and above the ground to adequately resolve a boundary layer development, whereas an unstructured grid was used to discretize a rest of the computational domain (see FIG. 7C and FIG. 7D). A grid independence test was carried out to determine an optimum grid size, and a grid size of 332×92×30 structured elements around the PV panel 104 was chosen. Inflation layers adjacent to solid surfaces, such as the surfaces of the PV panel 104, and the ground were based on a first cell height of 0.00002 m with a growth rate of 1.2 to ensure that the dimensionless wall distance (y+) is less than one (y+<1) for all cases in the experimental study.

The solar load model in the Ansys Fluent was used to include the solar radiation effects in the computational domain. This model allowed for radiation transmission and absorption through all glazed or semi-transparent surfaces and was, therefore, useful in determining the surface temperature, which is a direct indicator of performance of the PV panel 104. A main limitation of the solar load model is that it is unable to treat semitransparent coupled walls with different material layers with distinct absorptivity and transmissivity characteristics. Therefore, absorptivity and transmissivity characteristics of only the outer layers of the PV panel (glass), the purlins (aluminum) and ground (sand) were defined in the experiment analysis. Thermophysical and radiation properties of the materials used are presented in Tables 1 and 2, respectively.

TABLE 1

PV panel material layers and their properties

| Material | Thickness (mm) | Density (kg/m$^3$) | Thermal Conductivity (W/m · K) | Specific Heat (J/kg · K) |
| --- | --- | --- | --- | --- |
| Glass (front & back) | 3.0 | 2450 | 1.8 | 790 |
| EVA (upper & lower) | 0.5 | 960 | 0.346 | 2090 |
| PV cells | 0.2 | 2330 | 148 | 677 |
| Adhesive | 0.5-2 | — | 0.27, 1.2, 13.4 | — |

TABLE 1-continued

PV panel material layers and their properties

| Material | Thickness (mm) | Density (kg/m$^3$) | Thermal Conductivity (W/m · K) | Specific Heat (J/kg · K) |
|---|---|---|---|---|
| Purlin (Al) | 0.5-3 | 2770 | 205 | 875 |
| Sand (Silica) | — | 1500 | 0.25 | 830 |

TABLE 2

Material radiation characteristics

| Material | Absorptivity a | Transmissivity t | Reflectivity r |
|---|---|---|---|
| Glass/PV | 0.8 | 0.1 | 0.1 |
| Sand (Ground) | 0.58 | — | 0.2 |
| Purlin (Al) | 0.4 | 0.6 | — |

Once a converged solution was reached in the Ansys Fluent solver, the incident solar irradiation and surface heat transfer coefficient distributions on the PV panel 104 were used as input for a steady-state thermal analysis in the Ansys Steady-State Thermal module. In this step, the different layers of the PV panel 104 were modeled as a composite wall. The frontside of the PV panel 104 was subjected to the heat flux predicted in the Fluent flow simulation. The convection heat transfer from different exposed surfaces was modeled using the surface heat transfer coefficient predicted in Fluent flow simulation. To model radiation from the exposed surfaces, an emissivity of 0.85 was assumed for all surfaces. The solution of the steady-state thermal model was obtained using an iterative approach and was used to evaluate the surface temperatures with and without the use of purlins 118. The study also investigated the effect of thickness of the purlins 118 in reducing the temperatures on the backside of the PV panel 104. As described earlier, the thermal contact between the purlins 118 and the PV panel 104 is established by an adhesive 218 (see FIG. 2) to facilitate heat dissipation from the PV panel 104 to the atmosphere through the purlins 118.

Figure 8:
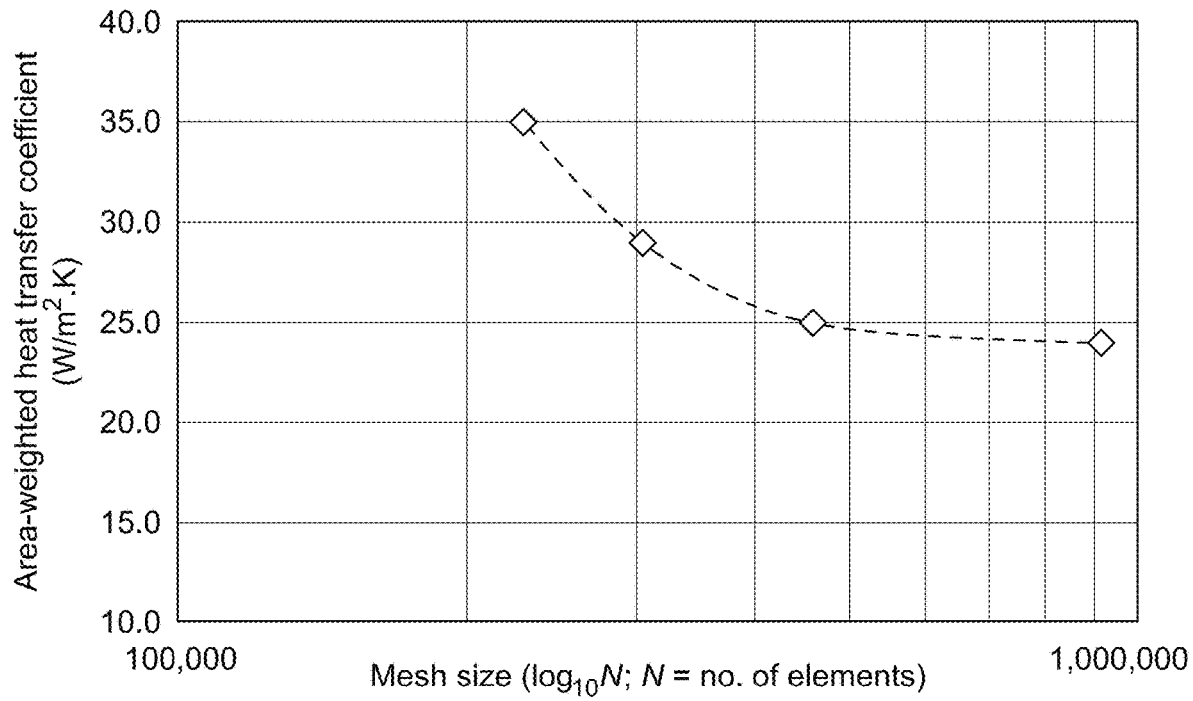
FIG. 8 is a graph depicting grid convergence runs, according to an aspect of the present disclosure.

FIG. 8 illustrates results of a grid dependency test. The simulations were performed at 4 different grid sizes, and the corresponding PV panel backside area weighted heat transfer coefficient was observed. A final grid size of 332×92×30 structured elements around the PV panel was chosen since it was affordable based on the available computational resource with reasonably good convergence.

Figure 9:
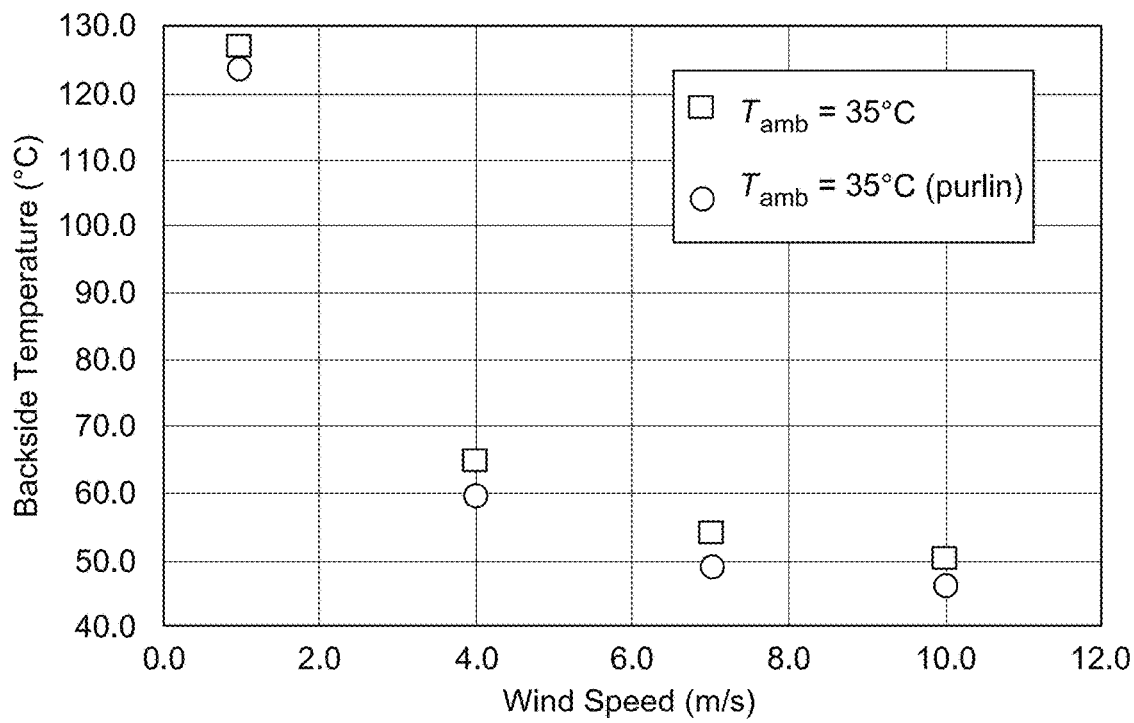
FIG. 9 is a graph depicting backside temperature predictions of the photovoltaic panel at various wind speed for with and without purlins configuration for baseline ambient conditions, according to an aspect of the present disclosure.
Figure 10:
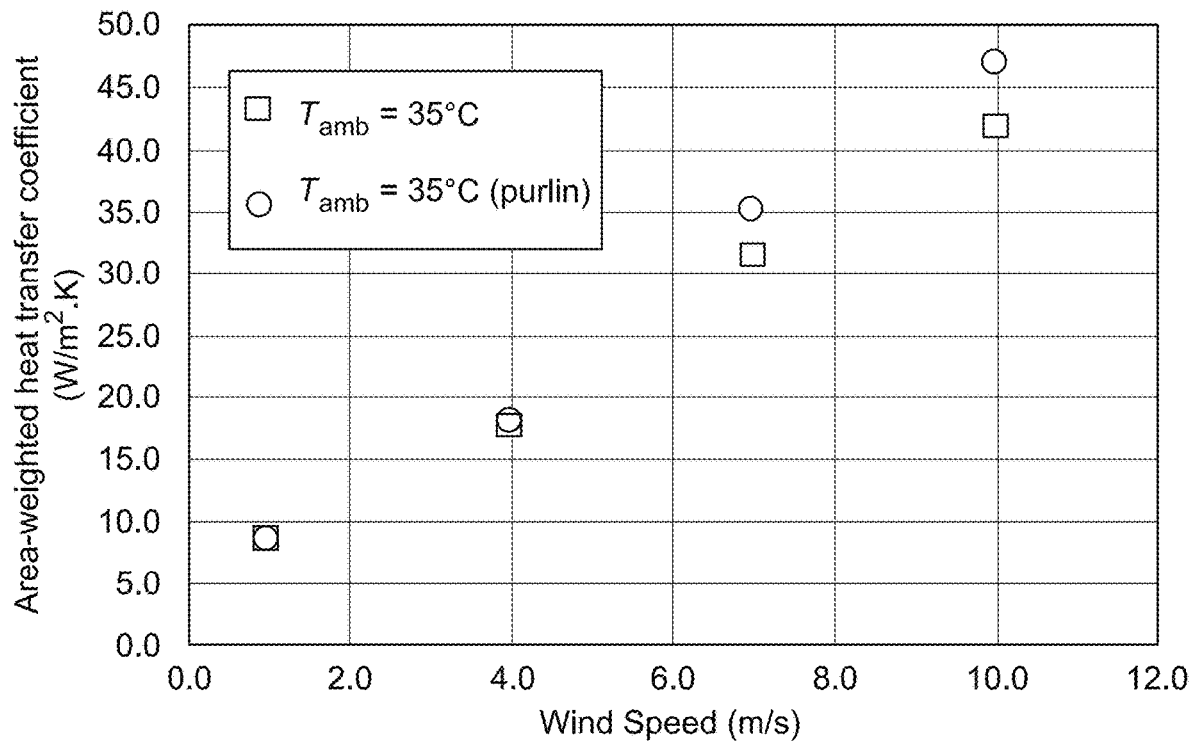
FIG. 10 is a graph depicting area-weighted surface heat transfer coefficient prediction at various wind speed for with and without purlins configuration for baseline ambient conditions, according to an aspect of the present disclosure.
Figure 11:
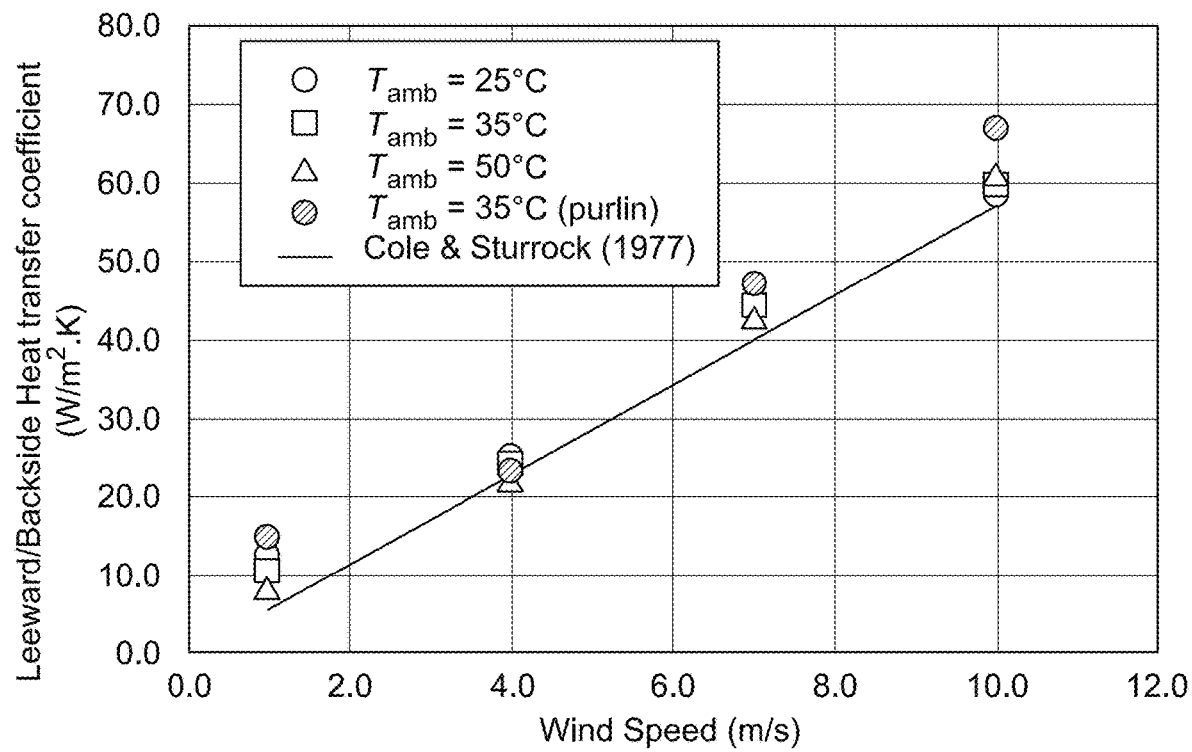
FIG. 11 is a graph depicting Leeward heat transfer coefficient prediction at various wind speed for with and without purlins configuration for baseline ambient conditions, according to an aspect of the present disclosure.

FIG. 9 illustrates a graph comparing PV panel backside temperature predictions at various wind speeds for with and without purlins for baseline ambient conditions. Initially, the PV panel 104 was exposed to the baseline ambient temperature of 35° C., and the backside temperature was observed at windspeeds ranging from 2 m/s to 12 m/s, without and with purlins 118. As shown in FIG. 9, the thermal contact of the purlin 118 with the PV panel 104 could reduce the temperature of the PV panel 104, and the effect was more significant at higher windspeeds. The corresponding changes in surface heat transfer coefficient were also noted as plotted in FIG. 10. Subsequently, a leeward heat transfer coefficient was predicted for different ambient temperatures and windspeeds and was correlated with the empirical results of Cole & Sturrock (1977), as shown in FIG. 11.

Figure 12:
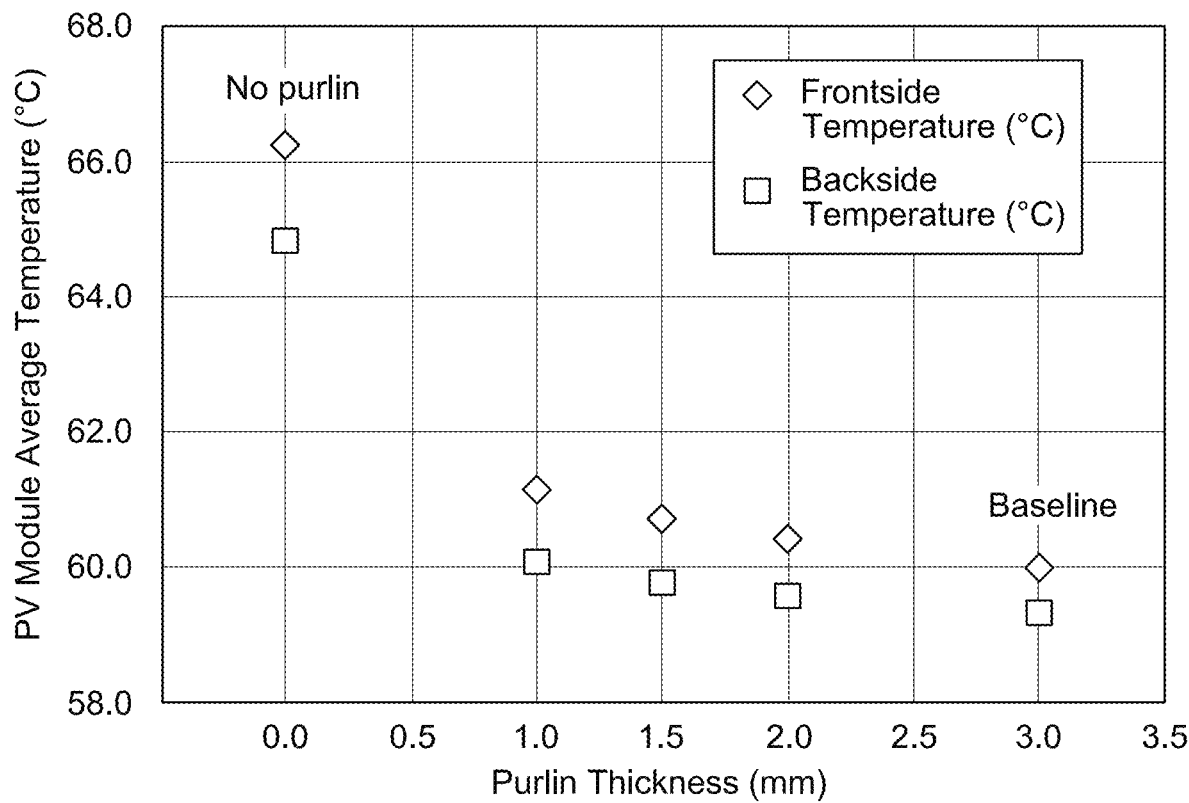
FIG. 12 is a graph depicting effect of thickness of purlins on an average temperature of the photovoltaic panel, according to an aspect of the present disclosure.
Figure 13:
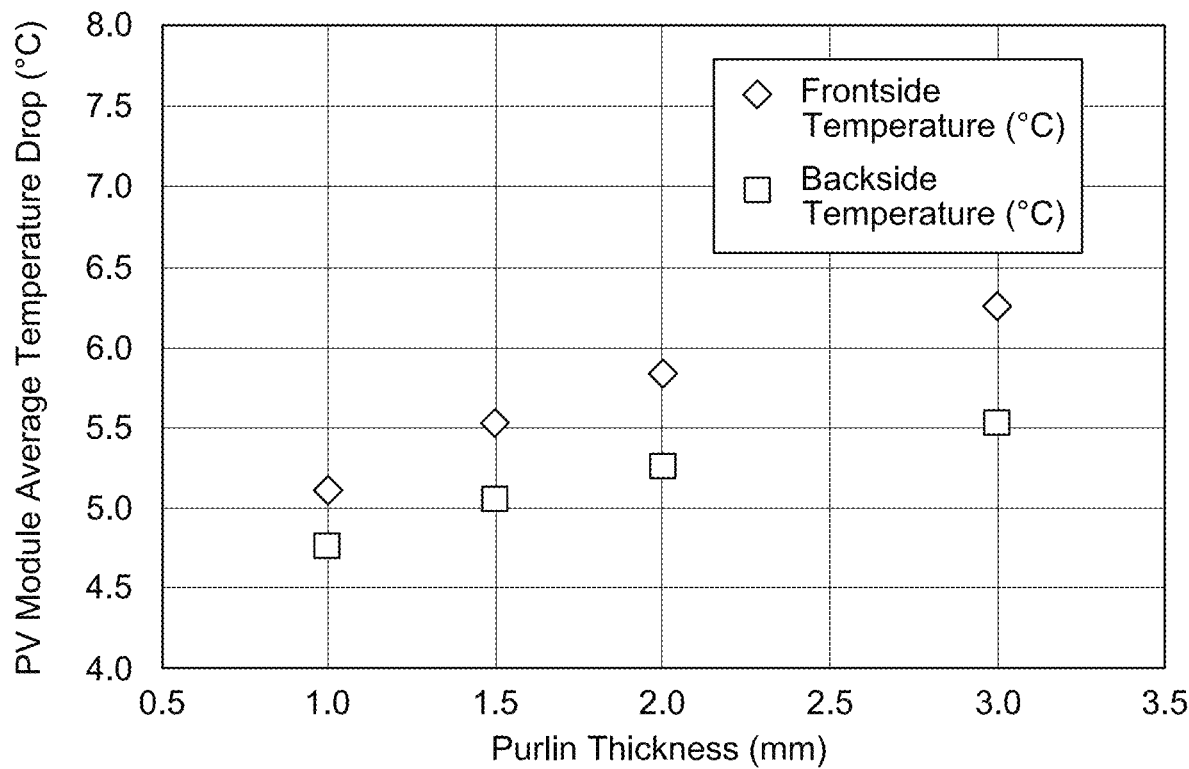
FIG. 13 is a graph depicting effect of thickness of purlins on an average temperature drop of the photovoltaic panel relative to a panel system without purlins, according to an aspect of the present disclosure.

An impact of thickness of the purlin 118 on the panel temperature is depicted in FIG. 12 and FIG. 13. As shown in FIG. 12, a difference between frontside average temperature and backside average temperature of the PV panel 104 is maximum in absence of the purlin 118, and the difference decreases with increase in thickness of the purlin 118. This may be more evidently observed in FIG. 13, which shows that a drop in average surface temperature due to thermal contact of the purlin 118 increases with increase in thickness of the purlin 118.

Figure 14:
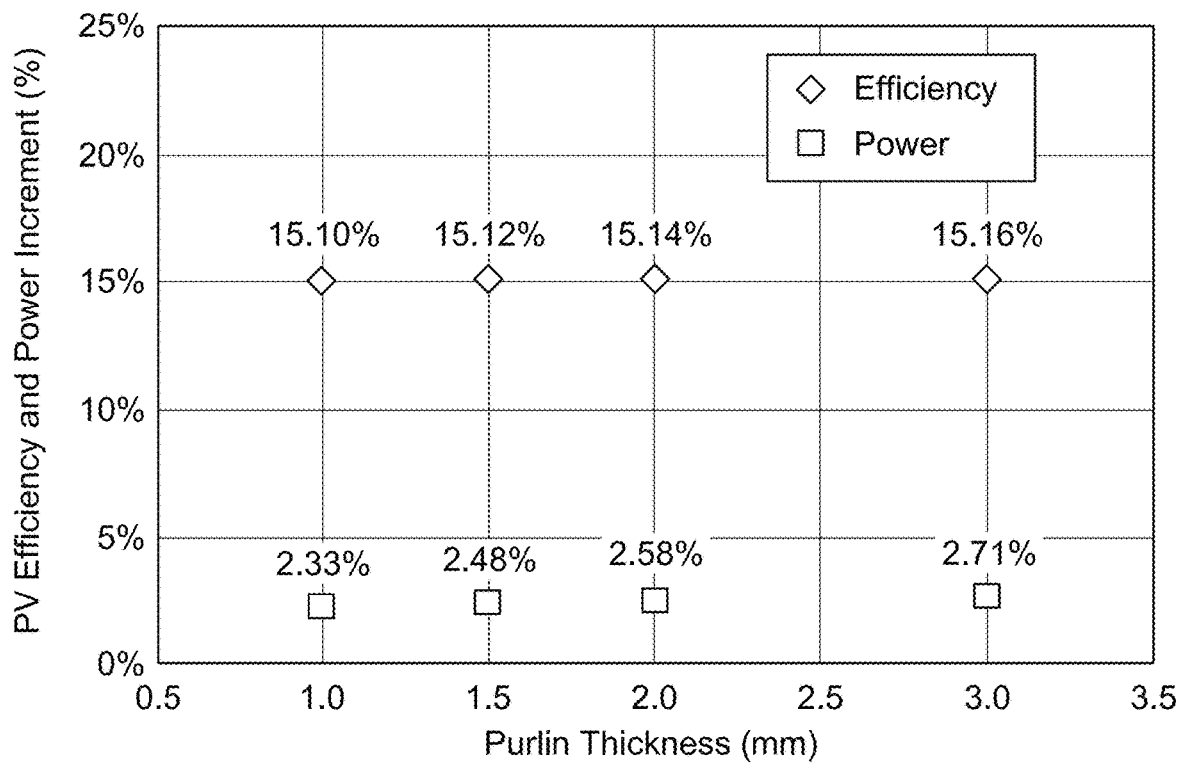
FIG. 14 is a graph depicting effect of thickness of purlins on efficiency and associated relative increase in power output of the photovoltaic panel, according to an aspect of the present disclosure.

Further, it will be understood that the efficiency of the PV panel 104 decreases with increase in the panel temperature. FIG. 14 illustrates that the efficiency of the PV panel 104 and an associated power output increases with increase in thickness of the purlin 118.

An individual analysis was carried out to study an impact of thermophysical properties of the adhesive (used to secure the purlins 118 with the PV panel 104) on the panel temperature. Accordingly, an effect of thermal conductivity, adhesive layer thickness, and conductance (ratio of thermal conductivity and the material thickness) were numerically tested by using the Ansys Mechanical's steady-state thermal model. A baseline case was chosen with properties listed in Table 3. The layers of the PV panel 104 along with the adhesive and the purlin 118 were modeled in the Ansys Mechanical's steady-state thermal model. For thermal conductivity, values of three different adhesive materials as obtained from a manufacturer were used, such as 0.27 W/m·K, 1.2 W/m·K, and 13.4 W/m·K. For the steady-state thermal analysis, an additional value of 6 W/m·K was also considered. In the case of adhesive thickness, five values were considered, such as 0.5 mm, 1.0 mm, 1.5 mm, 2.0 mm, and 5.0 mm. The adhesive thermal conductivity was chosen as 13.4 W/m·K. For the adhesive conductance, four different values based on minimum and maximum values of adhesive conductivity (0.27 W/m·K and 13.4 W/m·K) and material thickness (0.5 mm and 2 mm) were considered, such as 135 W/m$^2$K, 540 W/m$^2$K, 6700 W/m$^2$K, and 26800 W/m$^2$K.

TABLE 3

Baseline test case

| Variable | Value |
|---|---|
| Ambient temperature, $T_{amb}$ | 35° C. |
| Solar irradiance, S | 1000 W/m$^2$ |
| Wind speed, V | 4 m/s |
| Emissivity (all materials), e | 0.85 |
| Surface heat transfer coefficient, h | 9 W/m$^2$ · K (Frontside/windward side) |
| | 18 W/m$^2$ · K (Leeward side) |
| Adhesive thickness | 0.5 mm |

Figure 15:
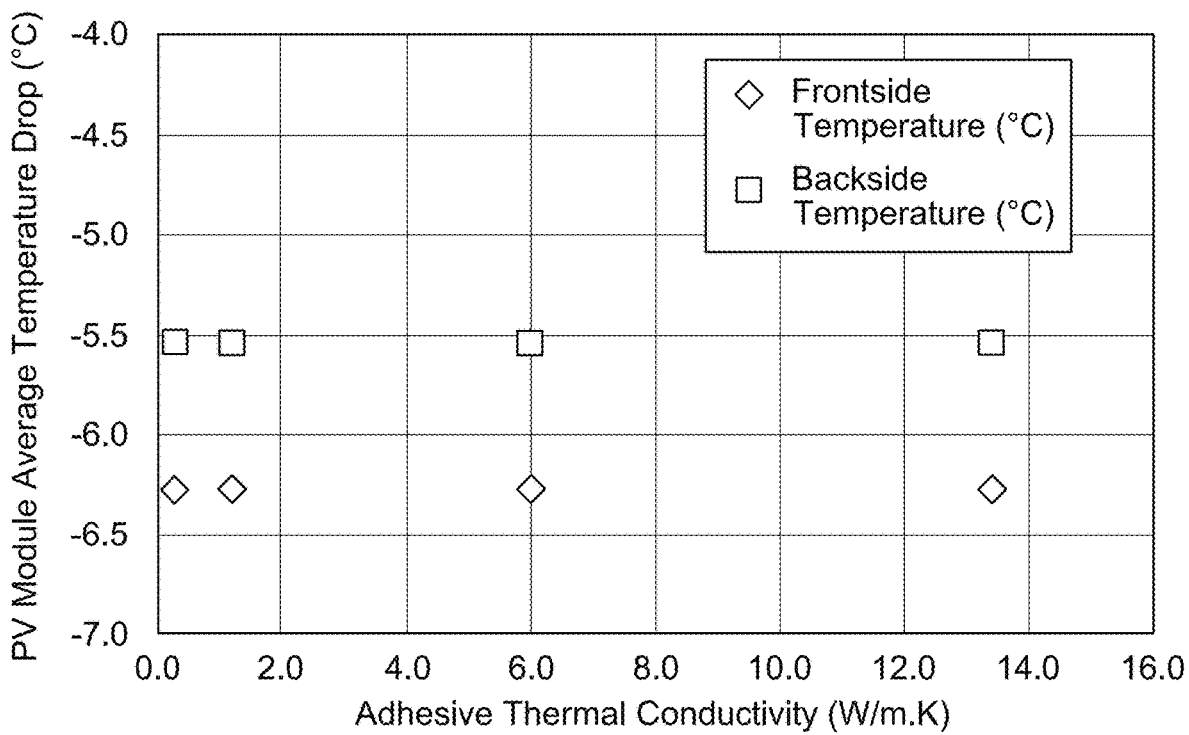
FIG. 15 is a graph depicting effect of thermal conductivity of an adhesive material used in the photovoltaic panel system, according to an aspect of the present disclosure.
Figure 16:
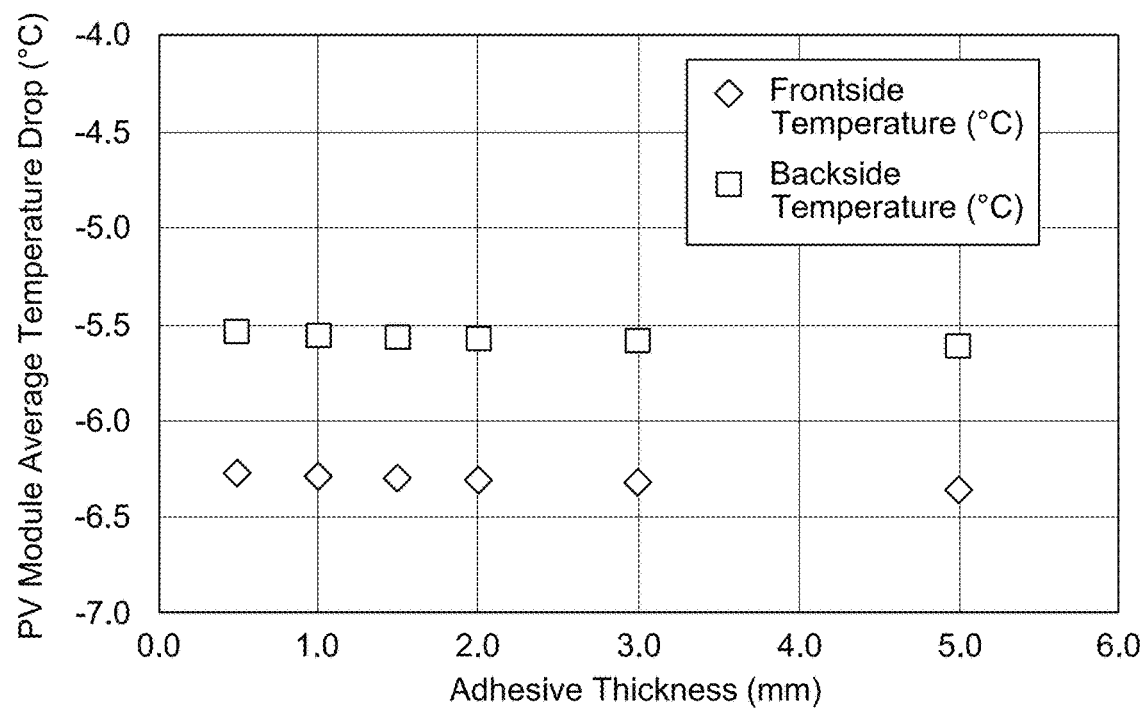
FIG. 16 is a graph depicting effect of thickness of the adhesive material on average temperature drop of the photovoltaic panel relative to a panel system without purlins, according to an aspect of the present disclosure.
Figure 17:
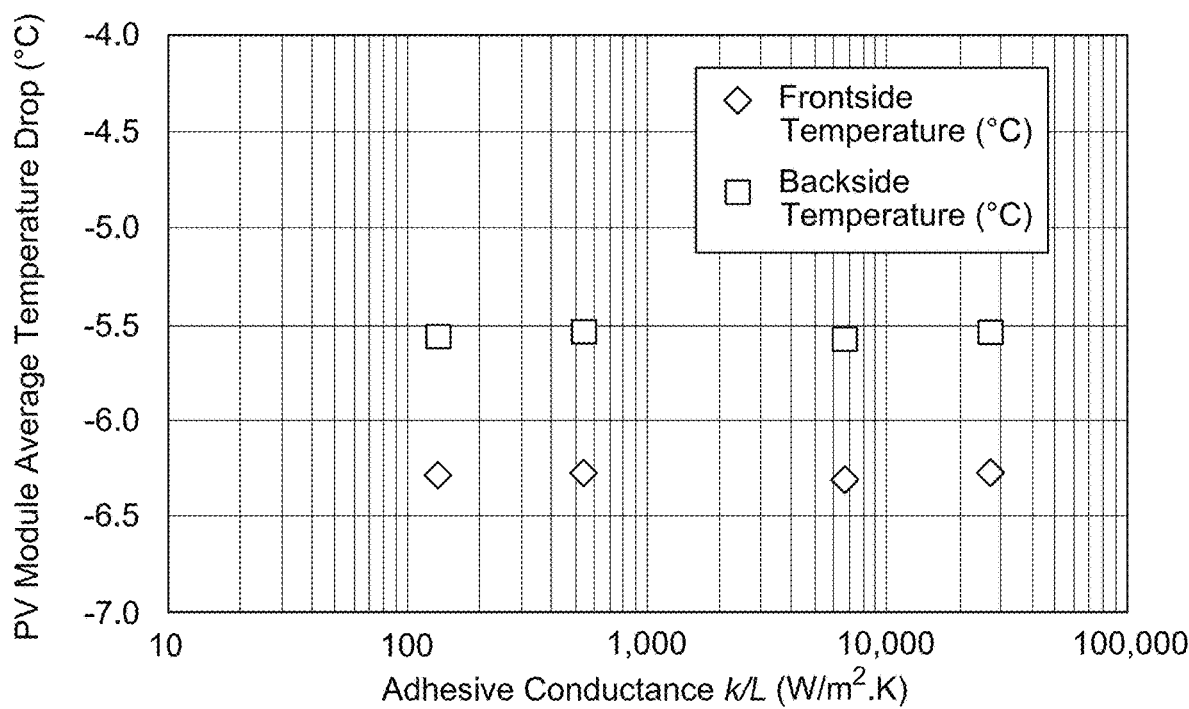
FIG. 17 is a graph depicting effect of conductance of the adhesive material on average temperature drop of the photovoltaic panel relative to a panel system without purlins, according to an aspect of the present disclosure.
Figure 18:
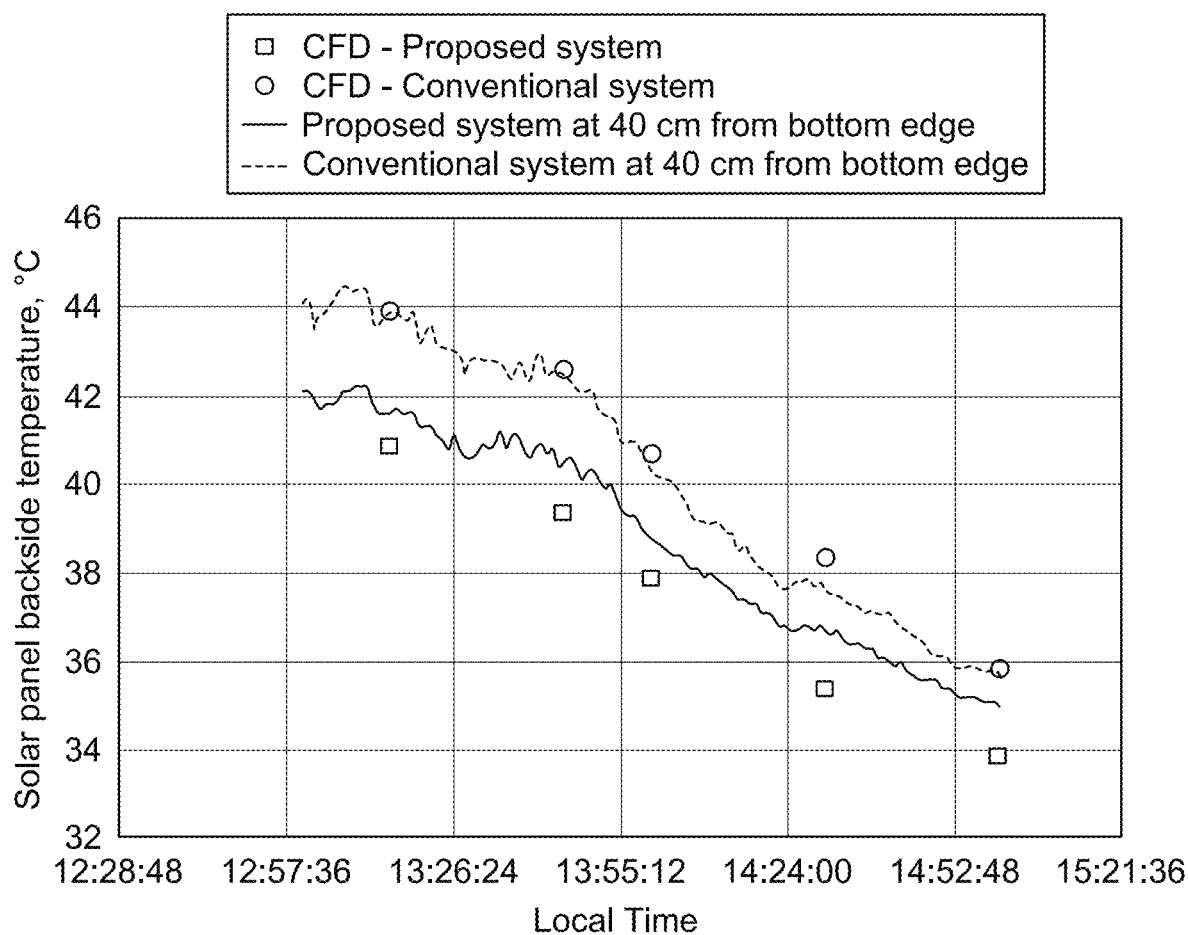
FIG. 18 is a graph depicting a first comparison of backside temperature of the photovoltaic panel of a conventional system and the photovoltaic panel system of the present disclosure with respect to a local time on Day-1.
Figure 19:
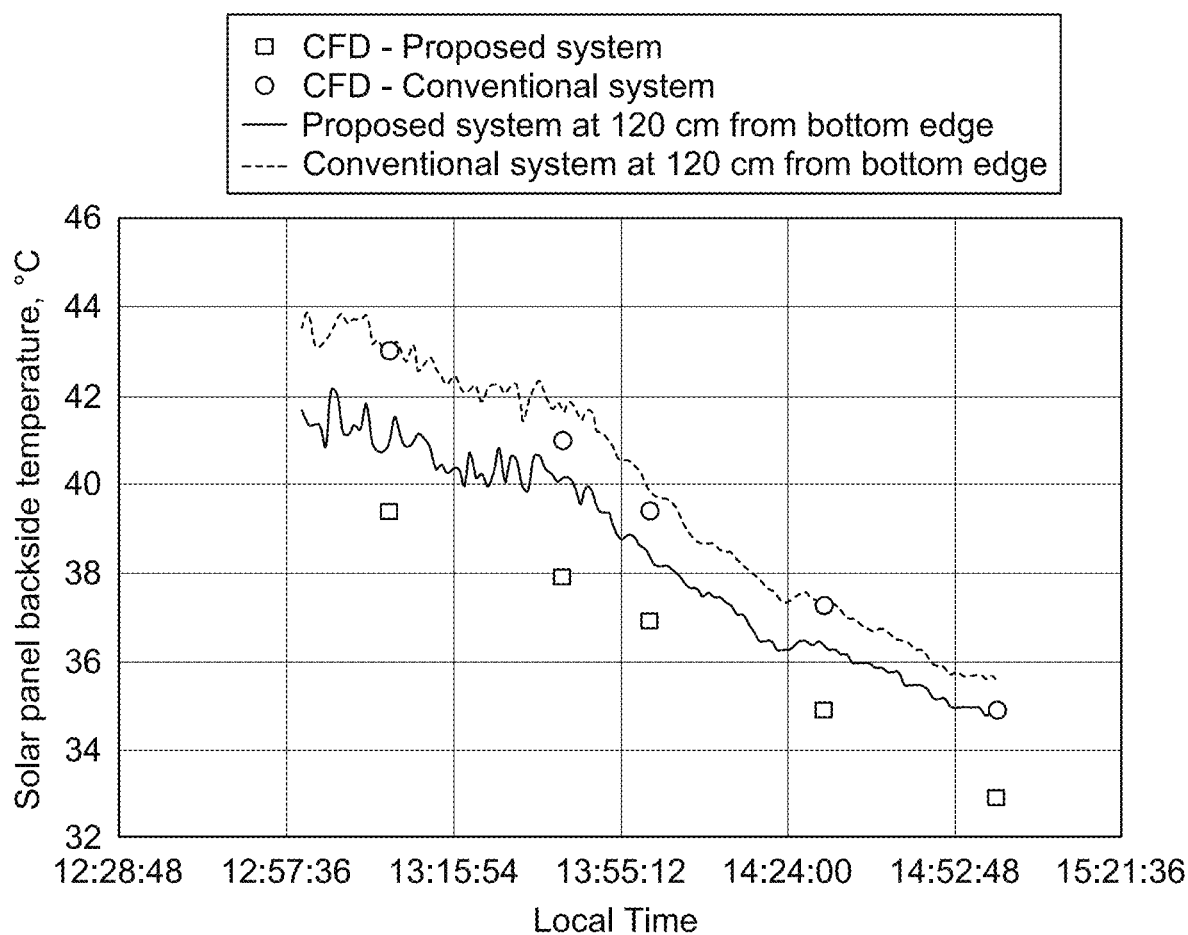
FIG. 19 is a graph depicting a second comparison of backside temperature of the photovoltaic panel of a conventional system and the photovoltaic panel system of the present disclosure with respect to a local time on Day-1.
Figure 20:
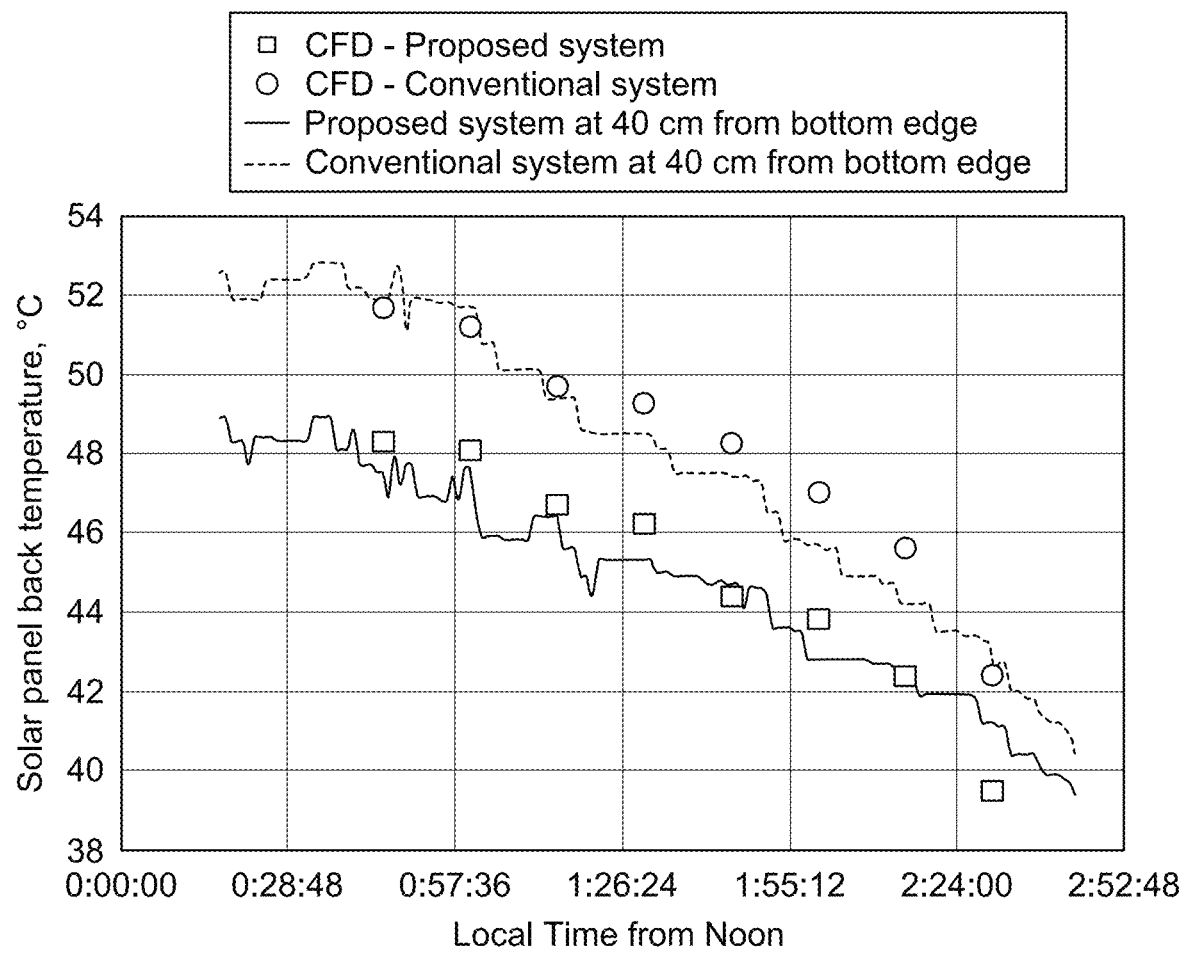
FIG. 20 is a graph depicting a first comparison of backside temperature of the photovoltaic panel of a conventional system and the photovoltaic panel system of the present disclosure with respect to a local time on Day-2.
Figure 21:
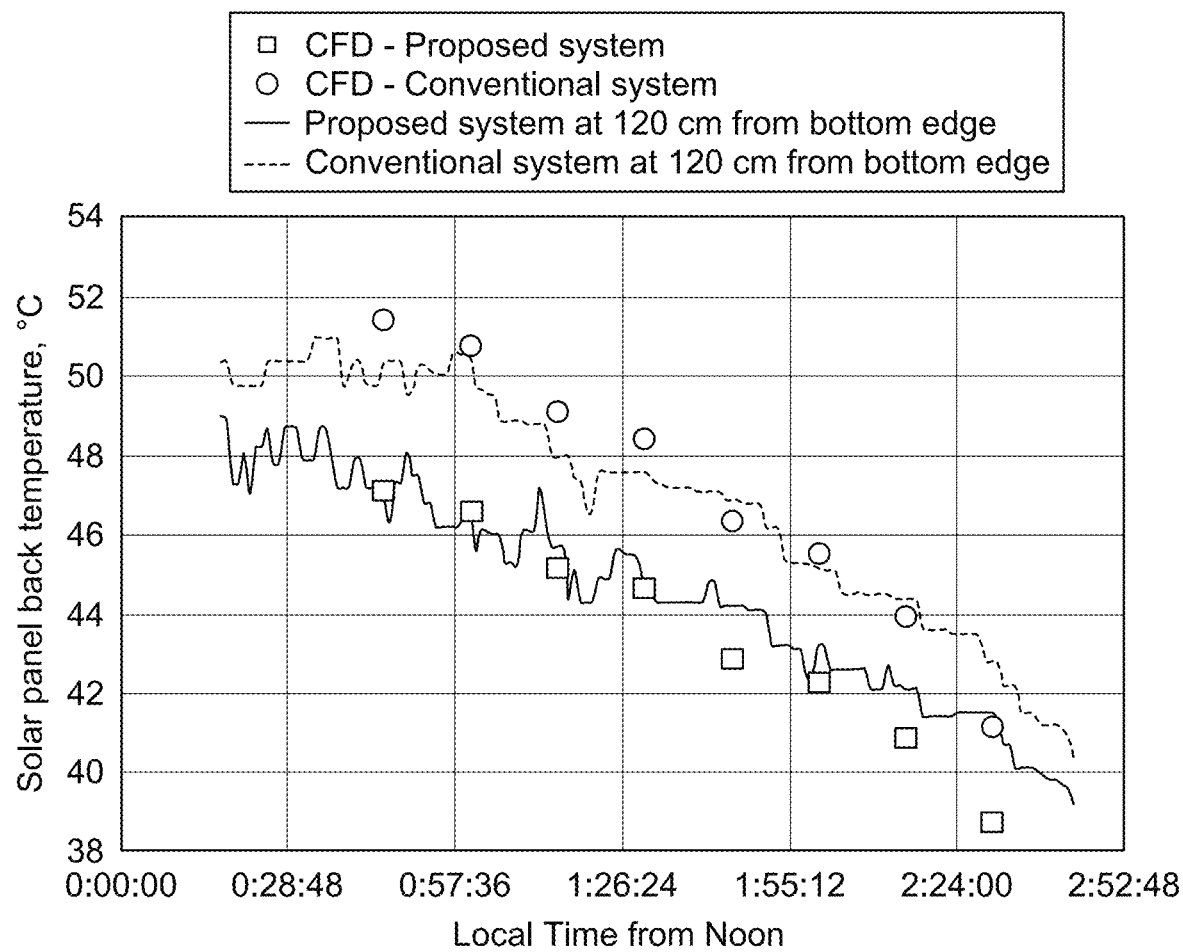
FIG. 21 is a graph depicting a second comparison of backside temperature of the photovoltaic panel of a conventional system and the photovoltaic panel system of the present disclosure with respect to a local time on Day-2.

The results of this analysis are presented in FIG. 15, FIG. 16, and FIG. 17, which clearly show that the thermophysical properties of the adhesive had no significant impact on the panel backside average temperature. A maximum temperature difference of 0.5° C. was found in case of 5.0 mm adhesive thickness with a thermal conductivity of 13.4 W/m$^2$·K.

Field experiments were conducted on both conventional system and the system 100 of the present disclosure to study their performance in real working conditions. The two systems were installed near Dammam international airport, Saudi Arabia. An off-grid inverter was configured to convert solar DC power to useful AC energy and store excess DC power to a battery. Each structure consisted of six PV panels arranged in two rows, and the temperature measurement was performed only on a middle panel of a top row. Two thermocouples at 40 cm and 120 cm from a bottom edge were connected to the backside of the PV panel, and the temperature was regularly monitored for 48 hours. Manufacturer information and specifications of the PV panels, adhesive material, inverter, and data logger are listed in Table 4. FIG. 18 to FIG. 21 show a comparison of numerical and experimental temperature data collected for two consecutive days from the conventional system and the system 100 of the present disclosure.

TABLE 4

Component specifications of experimental setup.

| Item | Specification | | Manufacturer/ Supplier |
|---|---|---|---|
| PV panel GIE-M60/290 | Electrical Characteristics (STC) | | Gree Electric Appliances, China |
| | Max power | 290 Wp | |
| | Power output | 5 W | |
| | Max efficiency | 17.64% | |
| | $V_{mpp}$ | 32.76 V | |
| | $I_{mpp}$ | 8.853 A | |
| | $V_{oc}$ | 39.32 V | |
| | $I_{oc}$ | 9.384 A | |
| | Cell temperature | 25° C. | |
| | Irradiance | 1000 W/m$^2$ | |
| Inverter | Rated power | 3 kW | Voltronic Power Technology Corp. Ltd., China |
| | Solar operating Voltage range | 120-450 V DC | |
| | Grid or load voltage | 230 V AC | |
| | Battery Voltage | 24 V DC | |
| Adhesive Material | Thermal conductivity | 6 W/m · K | Shenzhen AIKENUO Technology Co., Ltd., China |
| | Operating temp. range | −40~200° C. | |
| Data logger with 4-Channel K-type thermometer | Main unit temp. Range | −200-1370° C. | Gain Express Hong Kong |
| | Resolution | 0.1° C. | |
| | Accuracy (under 18~28° C. ambient temp) | ±(0.3% rdg + 1° C.) | |
| | Thermocouple temp. range | 50~200° C. | |
| | Sampling Rate | Programmable from 1 second up | |

Figure 22:
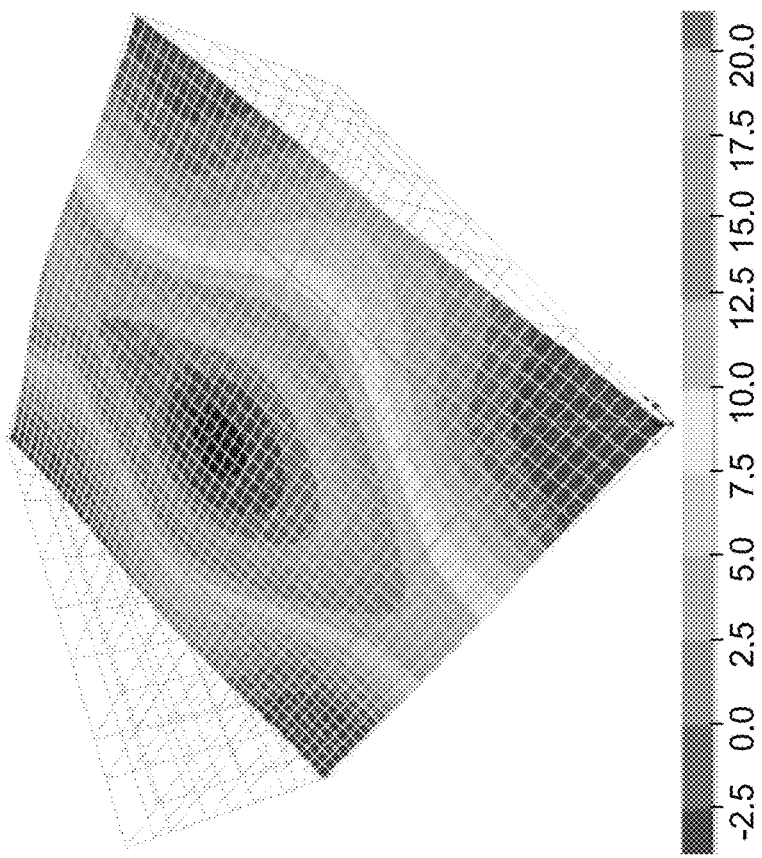
FIG. 22 shows deflection contours of the conventional system under compression wind (left) and suction wind (right) with peak deformation of 25.73 mm.
Figure 22:
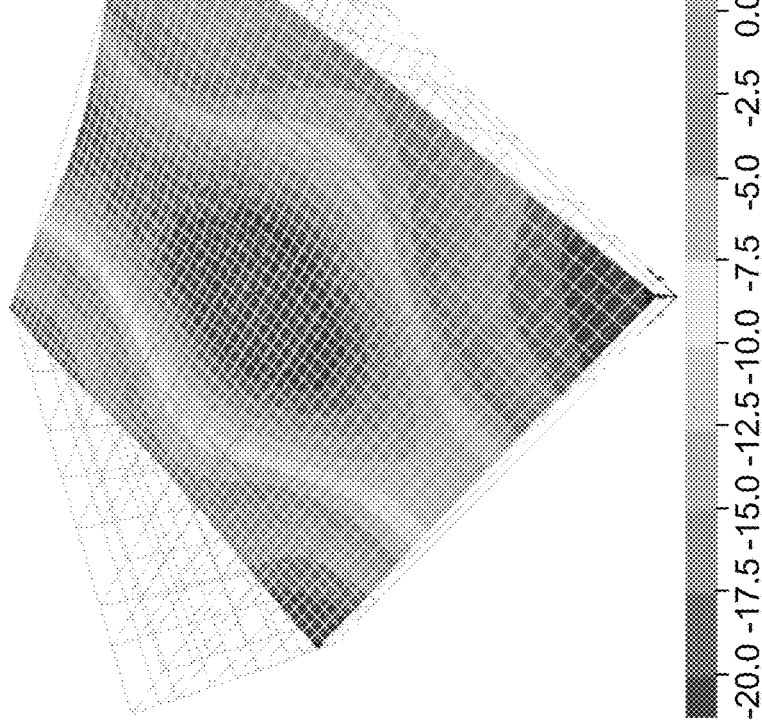
Figure 23:
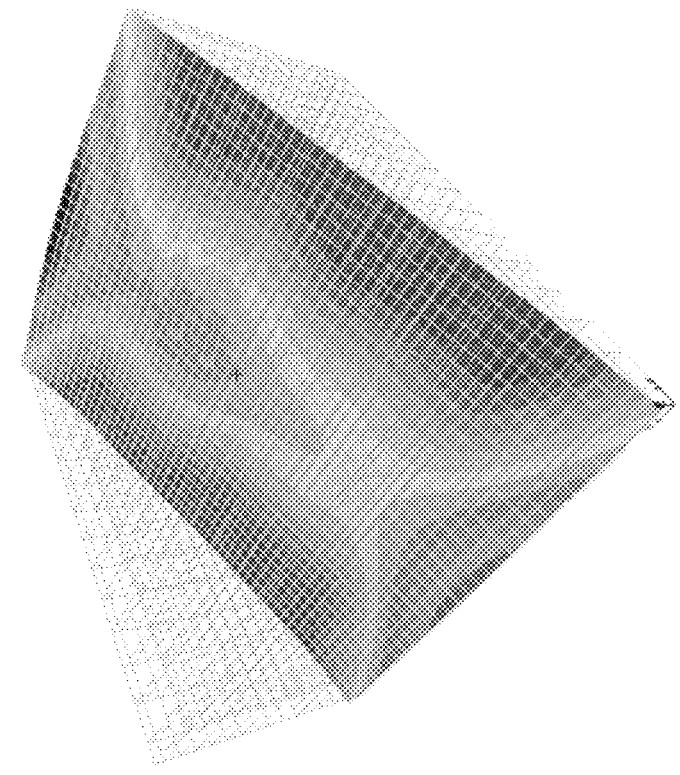
FIG. 23 shows deflection contours of the photovoltaic panel system of the present disclosure under compression wind (left) and suction wind (right) with peak deformation of 3.57 mm.
Figure 23:
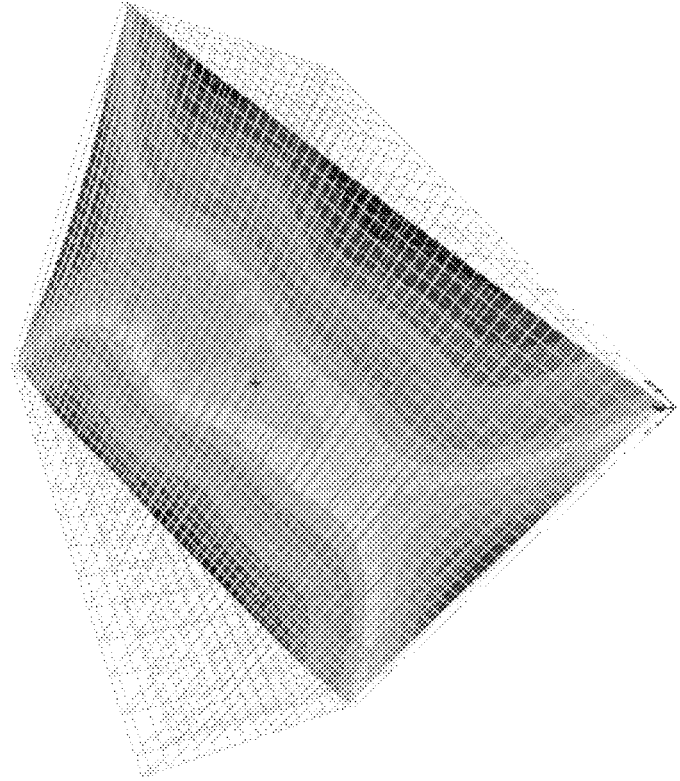

FIG. 22 shows deflection contours of the conventional system and FIG. 23 shows deflection contours of the system 100 of the present disclosure against compression wind load (left portion of each figure) and suction wind loads (right portion of each figure). For the conventional system, peak deflection is observed at the center of the PV panel under both compression wind load and the suction wind load. However, for the system 100 of the present disclosure, under applied compression wind load, the deflection is less and uniformly distributed except for the top and bottom free ends. Slightly higher deflection may be observed at the top and bottom free ends. Under suction wind load, the central uniform contour is well maintained for the system 100. As can be seen from FIG. 22, a captured peak deflection for the conventional system is 25.73 mm. However, the captured peak deflection is reduced to 3.57 mm for the system 100 as seen in FIG. 23. Thus, the system 100 of the present disclosure is capable of reducing the peak defection (or peak deformation) by 86.0% and, thereby ensures uniform distribution of the deflection over the PV panel 104.

Figure 24:
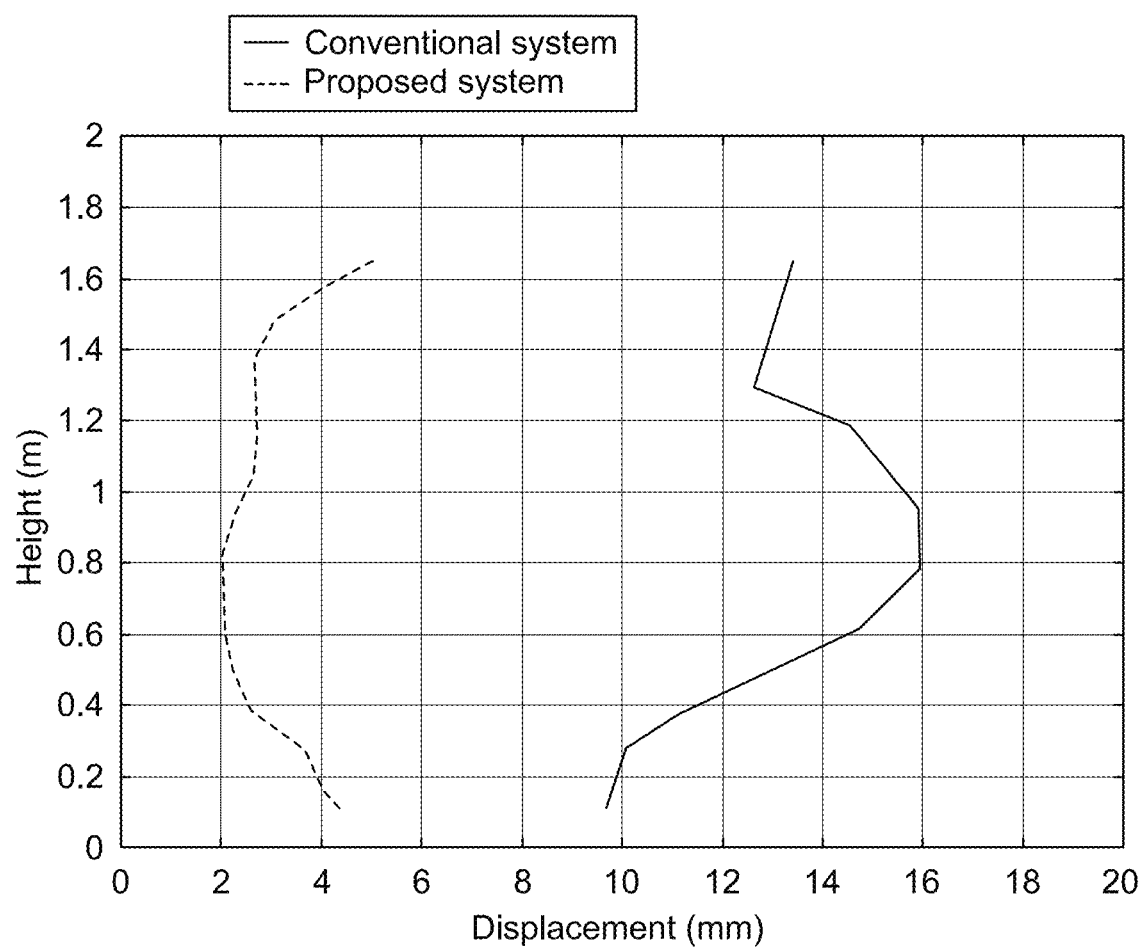
FIG. 24 is a graph depicting comparison of horizontal deflection of the conventional system and the photovoltaic panel system of the present disclosure.

The horizontal displacements of the conventional system and the system 100 of the present disclosure subjected to local (at Dammam) wind loads are illustrated in FIG. 24. A significant reduction in deflection values by the system 100 of the present disclosure is very clear through the curves. Compared to the conventional system, the deflection pattern of the system 100 of the present disclosure is nearly uniform especially at the central and top portions. Such uniformity may be attributed to the increased number of purlins 118 arranged with reduced spacing compared to the conventional system. The peak displacements at top panel surface under the applied wind loads were determined as 15.95 mm and 5.05 mm for the conventional system and the system 100 of the present disclosure, respectively.

Figure 25:
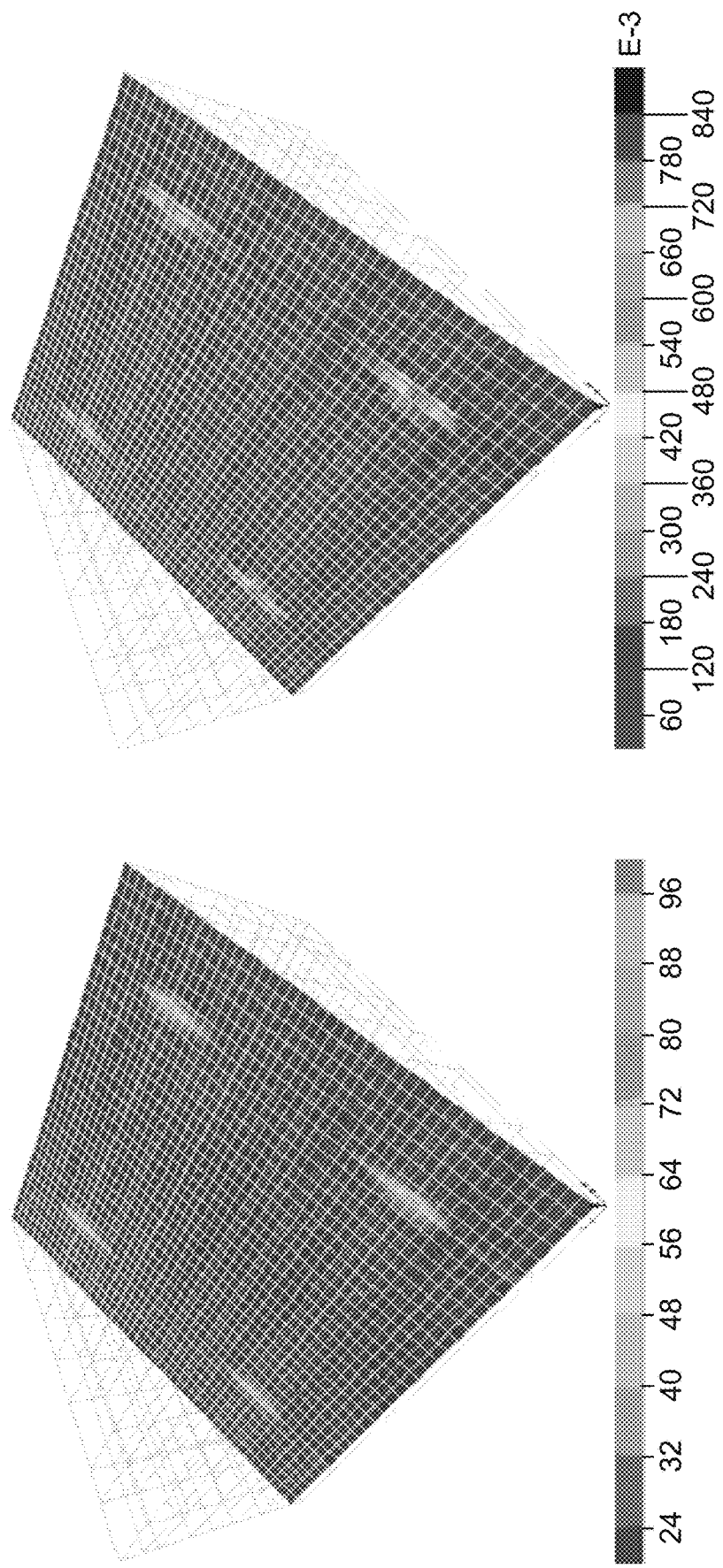
FIG. 25 shows contours of maximum principal normal stress and shearing stress experienced by photovoltaic panel of the conventional system.
Figure 26:
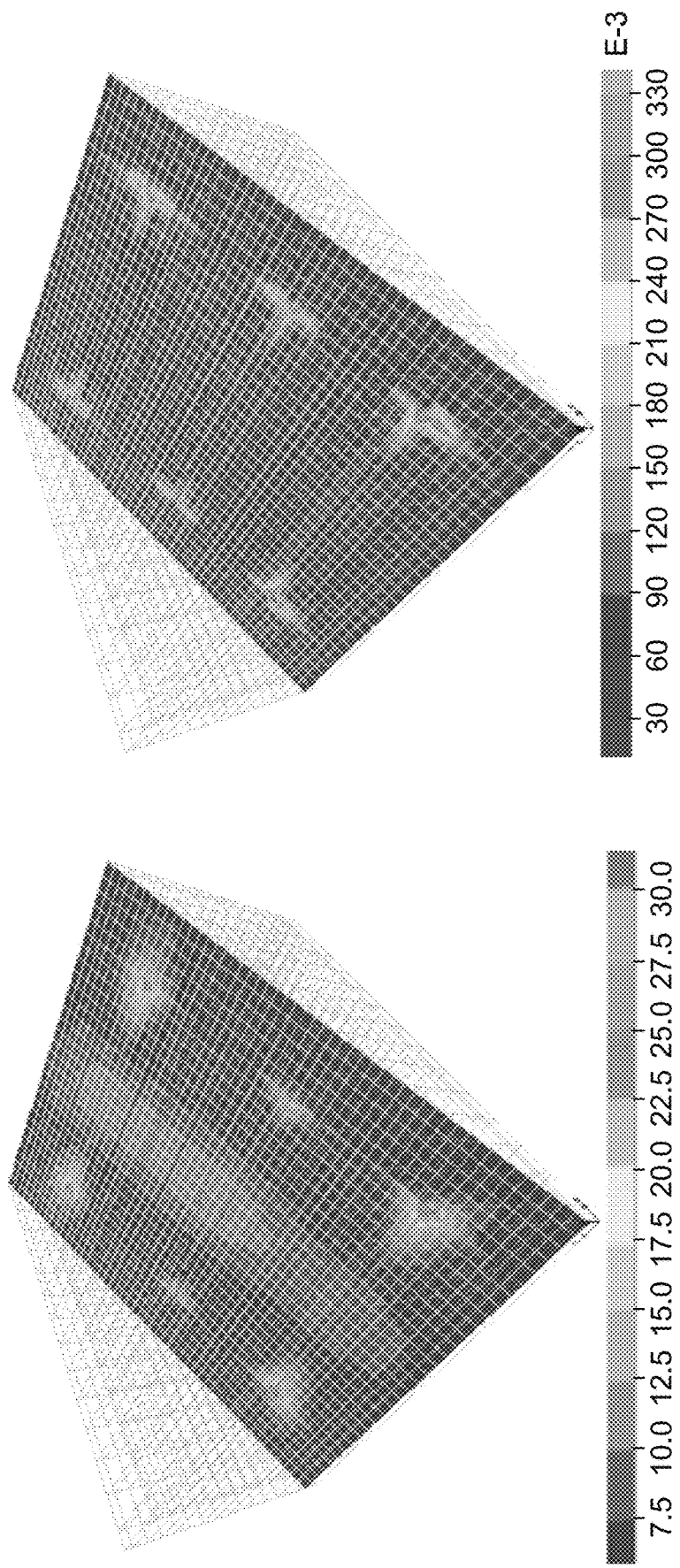
FIG. 26 shows contours of maximum principal normal stress and shearing stress experienced by the photovoltaic panel of the photovoltaic panel system of the present disclosure.

A typical maximum principal normal stress and shear stress are shown in FIG. 25 for the conventional system. Corresponding results of stresses for the system 100 of the present disclosure are shown in FIG. 26. As can be seen in FIG. 25, the regions of high stresses are located in the proximity of connection of columns to girder, which agrees with an expected load path. Regions around the purlins and girders experienced stresses relatively lower than the regions of intersection of the horizontal members and the purlins. On the other hand, remainder of the regions on the PV panel showed lowest stress values. The highest contact stresses reach around 90.31 MPa and 0.85 MPa of principal normal stress and shear stress, respectively. Such stresses are generated by excessive racking displacements, which might cause local damage at the panel-purlin interface. Peak stress values in critical areas are almost the same.

Simulation was also performed with equivalent wind loads acting on the PV panels supported on the purlins of smaller spacing to assess the viability of the system 100 under compression wind loads. General views of the induced principal normal stress and shear stress are as shown in FIG. 26. The principal normal stress and shear stress have been weakened compared to the conventional system after redistributing the purlins 118. The distribution of principal normal stress and shear stress appeared almost in a uniform pattern throughout the system 100. The highest stresses reach around 33.4 MPa (63% reduction) and 0.83 MPa (2.3% reduction) of the principal normal stress and shear stress, respectively. Such low stress values and distributions highly reduce the occurrence of local damage or even cracks. As such, the system 100 of the present disclosure showed enhanced results compared to the conventional system.

Figure 27:
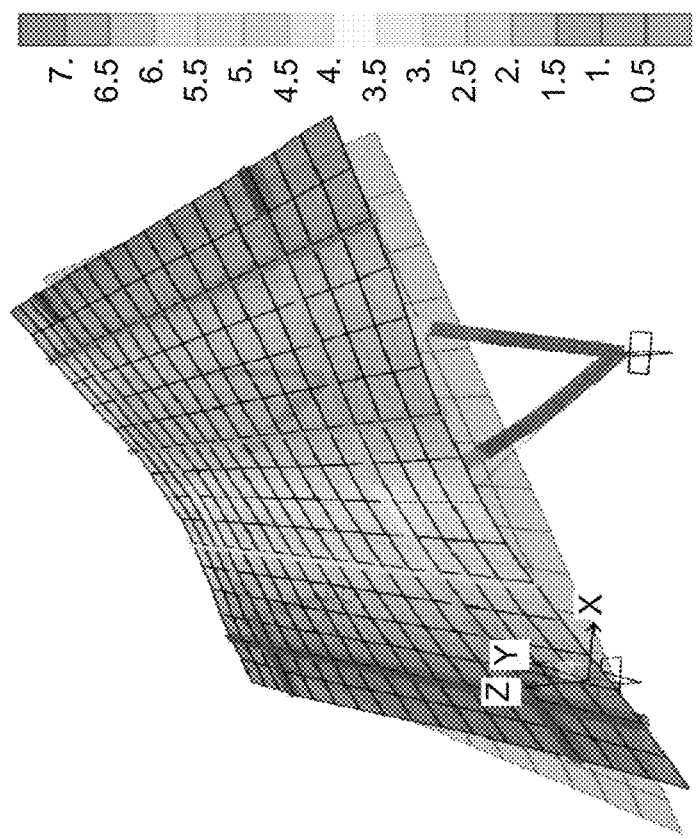
FIG. 27 shows displacement contours of the conventional system under applied earthquake load in x-direction (left) and y-direction (right)
Figure 27:
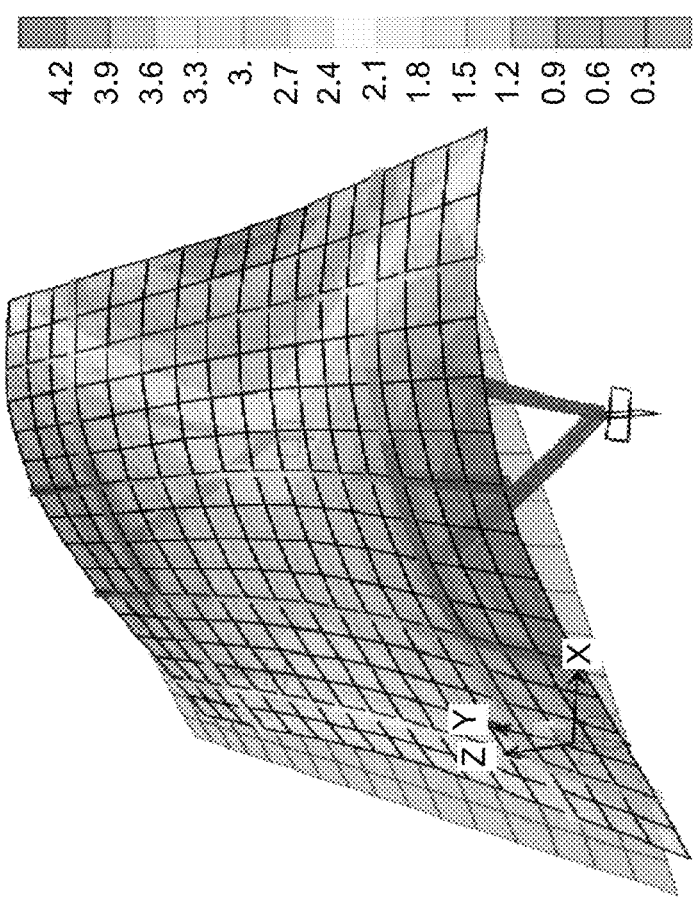
Figure 28:
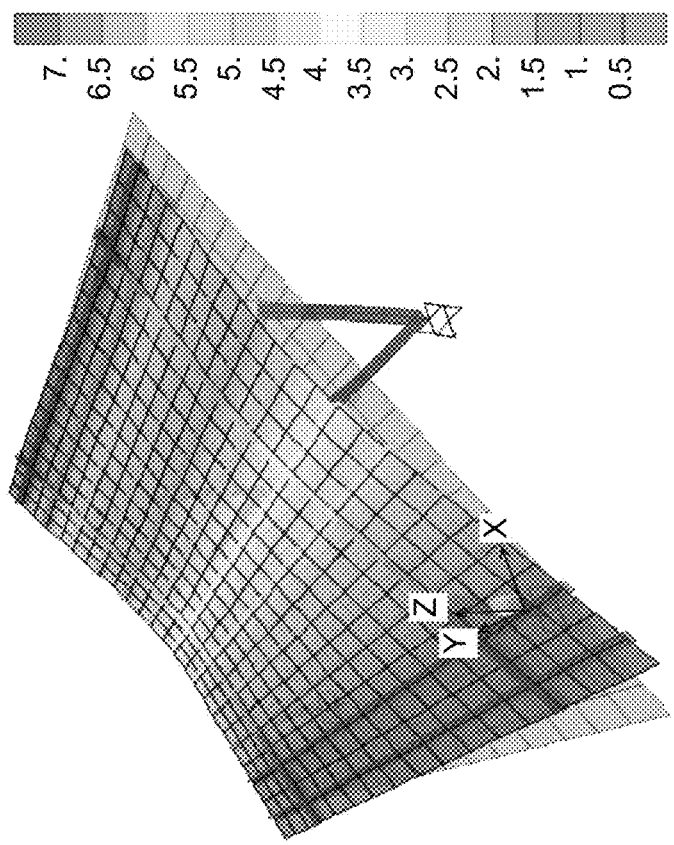
FIG. 28 shows displacement contours of the photovoltaic panel system of the present disclosure under applied earthquake load in x-direction (left) and y-direction (right)
Figure 28:
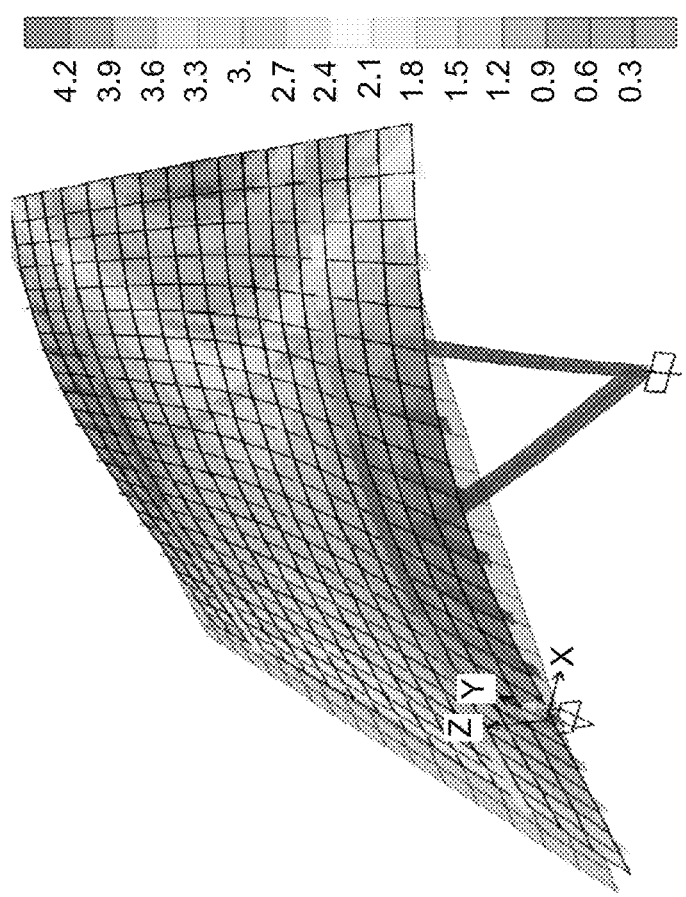

The floor displacements obtained from RS analysis are shown in FIG. 27 for the conventional system and FIG. 28 for the system 100 of the present disclosure. Form the FIG. 27 and FIG. 28, it will be understood that the displacement contours for the conventional system and the system 100 are similar with no obvious differences under an applied earthquake load in x-direction. For seismic excitation applied in y-direction, the two systems provided similar displacement contours. The captured displacement value in x-direction was determined as 4.24 mm for both the conventional system and the system 100 of the present disclosure. Similarly, the displacement value of the two systems subjected to seismic load in y-direction was determined as 6.86 mm. A reason behind the similar behavior of the two systems is that Dammam is one of the locations (in KSA) with a lowest seismic intensity. Consequently, the applied seismic loads in both x-direction and y-direction are of minimum values following the requirements of a seismic design code. Both systems also exhibit same torsional movements for the applied seismic load in y-direction.

Additionally, an onsite measurements of deflection of the PV panel 104 was recorded for both the conventional system and the system 100 of the present disclosure. The deflection of the PV panel 104 was measured using a high-performance easy handling data logger (model no. TDS-630) and two Linear Variable Differential Transformers (LVDTs) (model no. CDP-25) manufactured by Tokyo Measuring Instruments Laboratory Co., Ltd., Japan. The LVDTs were placed at a centroid of the PV panels 104, which were supported by magnetic holder (KANETEC Co. Ltd., Japan). The data logger was programmed to take the readings (in mm) of the deflection of the PV panel 104 at one second interval for a period of about four hours (i.e., ~13,800 set of readings).

Figure 29:
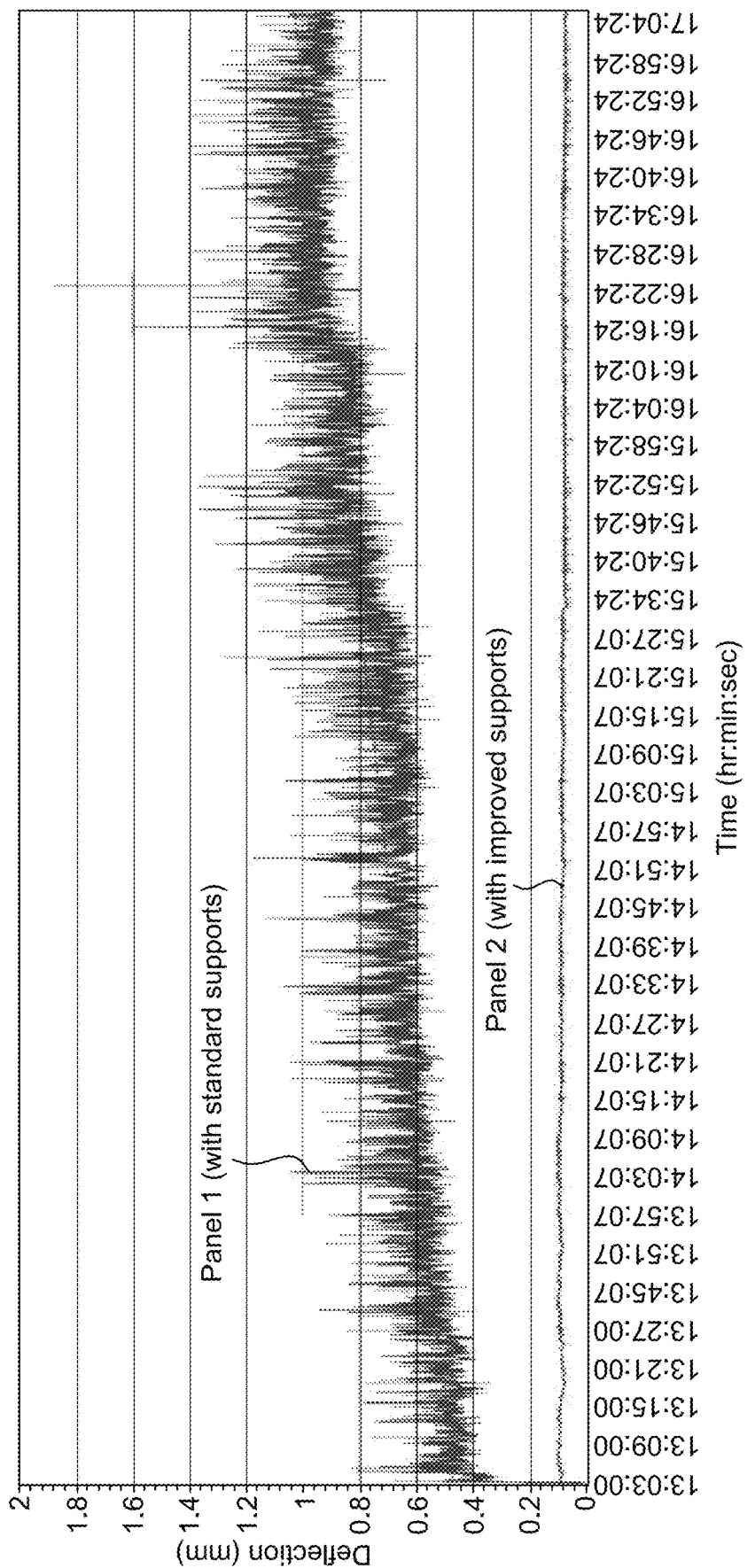
FIG. 29 is a graph depicting comparison of experimental observations of panel deflection in the conventional system and the photovoltaic panel system of the present disclosure.

FIG. 29 illustrates a graph of the deflection of the conventional system and the system 100 of the present disclosure versus time for about five hours under real wind action. As may be seen in FIG. 29, the deflection of the PV panel in the conventional system varies significantly with time with maximum and minimum values recorded as 1.88 mm and 0.233 mm, respectively. Such dynamic deflection may result in development of fatigue and eventual cracks. However, in the system 100 of the present disclosure, the deflection of the PV panel 104 is almost negligible (maximum 0.106 mm and minimum 0.042 mm) at all wind velocities. These values indicate that the system 100 significantly reduces induced deflections with time and yields very low values compared to the conventional system. In addition, it may be observed that, beyond the maximum and minimum peaks, time-histories of the conventional system bounce back and oscillate almost around initial deflection values. However, the result showed that the redistribution of the purlins 118 in the system 100 of the present disclosure had an influence on the deflection behavior of the PV panel 104, as the peaks of oscillations were eliminated.

Figure 30:
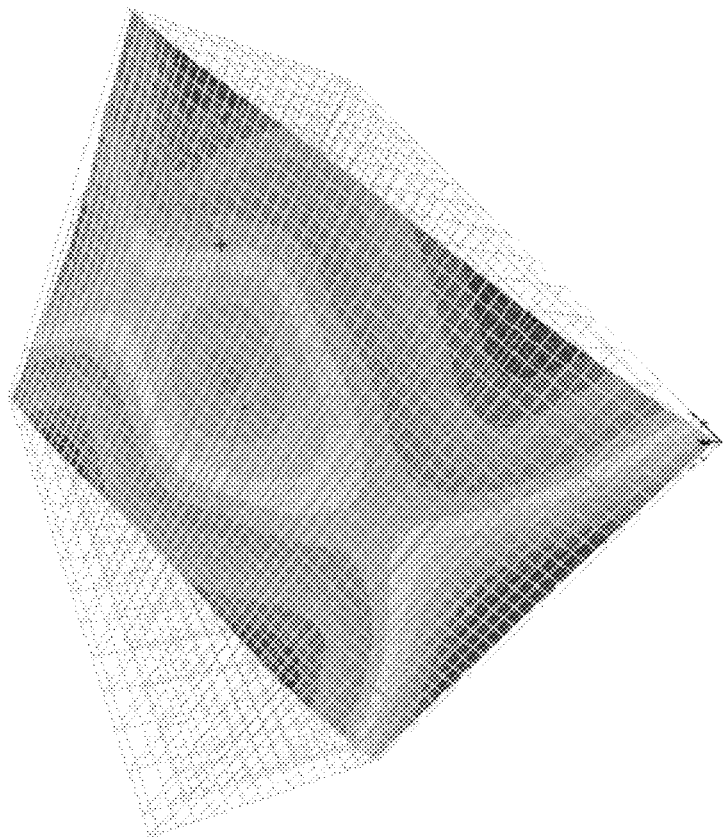
FIG. 30 shows contours of numerical predictions of peal panel deflection in the conventional system (left) and the photovoltaic panel system of the present disclosure (right), under experimental conditions.
Figure 30:
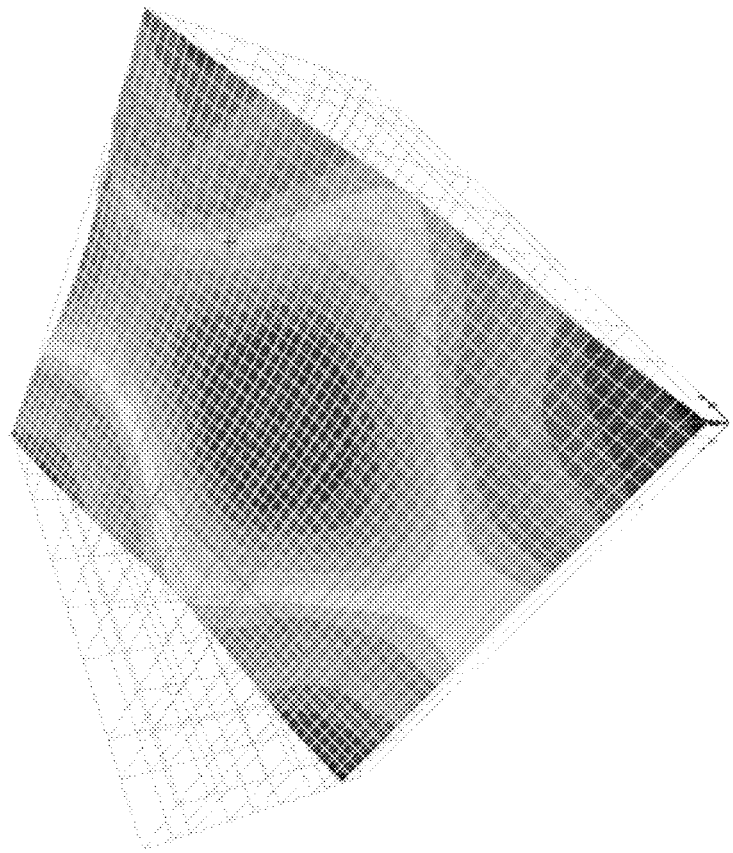

To compare the measured peak deflection with numerical prediction, simulation was run with the experimental conditions, and deflection contours were generated as illustrated in FIG. 30. The measured peak deflections almost agree with the numerical values for both the conventional system (numerical=1.746 mm; experimental=1.88 mm) shown on left portion of FIG. 30 and the system 100 of the present disclosure (numerical=0.118 mm; experimental=0.106 mm) shown on right portion of FIG. 30, which validates the numerical model.

Figure 31:
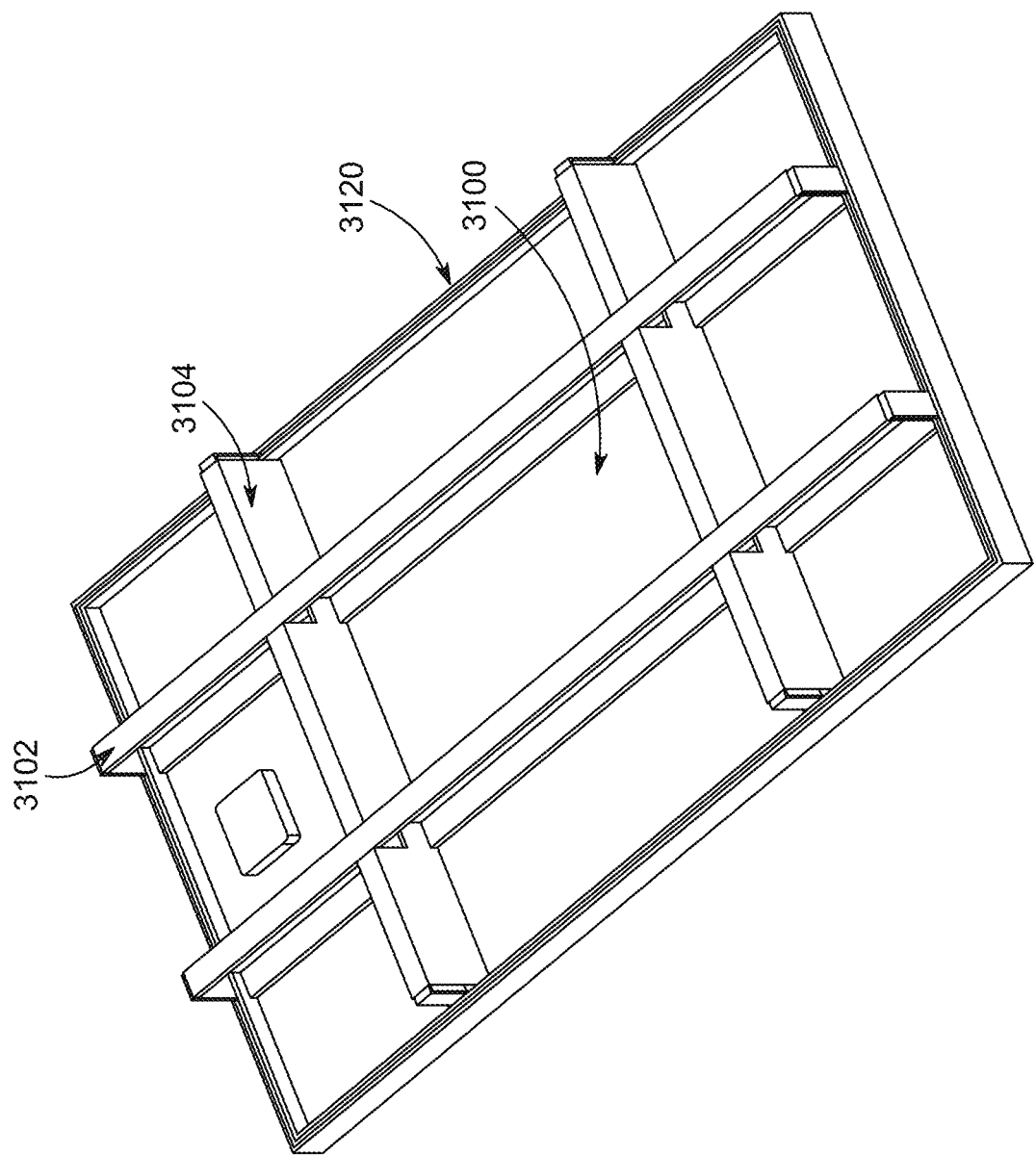
FIG. 31 illustrates crossbar elements of the photovoltaic panel system with a lip around the photovoltaic panel system, according to an aspect of the present disclosure.

FIG. 31 illustrates crossbar elements 3100 provided on the back surface 512 of the PV panel 104. FIG. 31 is another embodiment of the crossbar elements 500 in FIGS. 5A and 5B. In an embodiment, the crossbar elements 3100 include a long member 3102 spanning the length "L1" of the PV panel 104 and a short member 3104 spanning the width "W1" of the PV panel 104. In an embodiment, the long member 3102 has a top surface and a bottom surface, and the short member has a top surface and a bottom surface. As seen in FIG. 31, the long member 3102 and the short member 3104 intersect to form a common surface such that the top surface of the long member 3102 and the top surface of the short member 3104 are coplanar and, similarly, the bottom surface of the long member 3102 and the bottom surface of the short member 3104 are coplanar. In some embodiments, the crossbar elements 3100 may have one of "C" shaped cross-section or "I" shaped cross-section. In some embodiments, a groove (not shown) may be defined at ends of each of the long member 3102 and the short member 3104 to allow fixation of the crossbar elements 3100 with an aluminum frame which may have extensions that match the end faces of the long and short members. Such a design configuration provides a flat surface where purlins are attached to the aluminum frame without any protrusion which otherwise results in creation of an airgap, e.g., between the purlin and the frame, or thermal resistance. Further, an aperture is defined at the ends of the long member 3102 and the short member 3104 to allow joining of the PV panel 104 with the crossbar elements (or purlins) through fasteners, such as the bolt, in addition to the adhesive (such as, silicon paste). In some embodiments, an automatic machine press, such as Spi-Frame Press 4600 may be used to press the crossbar elements 3100 and the four corner keys together using hydraulic controls to provide sufficient integrity and cohesion. In an embodiment, the crossbar elements 3100 are manufactured with an extrusion process, e.g., the crossbar elements 3100 are of unibody construction. In an embodiment, the PV panel 104 includes a lip 3120 extending from the back surface of the PV panel in the aluminum frame around a perimeter of the PV panel. The lip 3120 preferably covers an edge face of the PV panel 104 and extends backwards from the back surface of the PV panel 104 no more than ½ the height of the crossbar elements 3100. Extensions of the lip 3120 may function as end plates for fastening the crossbar securely a back surface of the PV panel 104. Herein, the back surface is the surface of the PV panel 104 that contains the long members 3102 and short members 3104 on its surface. The lip 3120 of the aluminum frame is a perimeter edge or face that extends from a front face of the PV panel 104 to the back surface of the PV panel 104. That is, the long members 3102 and short members 3104 extends across both the length and width of the PV panel 104, on the back surface of the PV panel 104 with the lip 3120. In an embodiment, a corner clamp is present where the vertical crossbar and the horizontal crossbar of the aluminum frame meet. In an embodiment, the vertical crossbar and the horizontal crossbar of the aluminum frame are also made of aluminum. In an embodiment, there is no air gap between the PV panel 104 and the lip of the aluminum frame 3116. In an embodiment, the PV panel 104 has two L-shaped hooks in which the long members 3102 attach to positioned on one side of the PV panel 104. In an embodiment, the crossbar elements 3100 are attached to the PV panel 104 with a silicon sealant. In an embodiment, two additional L-shaped hooks also attach the short members 3104 to the PV panel 104. In an embodiment, the four total L-shaped hooks are made of aluminum. In an embodiment, the short members 3104 have a "U" shaped cross section. In an embodiment, the U-shaped beams 3104 attach to the L-shaped beams 3102 through grooves in the U-shaped beams 3104. In an embodiment, each U-shaped beam contains two grooves. In an embodiment, two short members 3104 span the width of the PV panel 104 and two long members 3102 span the length of the PV panel 104. The design of such a configuration provides the necessary mounting support and compressive strength at the back of the PV panel 104, which will reduce the probability of solar cell cracking. Further, the configuration facilitates effective heat dissipation from the panel surface through the frame structure itself. In an embodiment, the long members 3102 and short members 3104 lay along the face of the PV panel 104 as to create a tic-tac-toe pattern with nine rectangular segments in three rows of three segments. In an embodiment, the segments in the upper-left corner, upper-right corner, lower-left corner, and lower-right corner are equally sized. In an embodiment, the segments in the upper-left corner, upper-right corner, lower-left corner, and lower-right corner are smaller in length and width than the remaining five segments.

FIG. 31 shows the two short members 3104 that span across the width of the back surface 512 (see FIG. 5) and two long members 3102 than span across the length of the back surface 512 (see FIG. 5). In an alternate embodiment, only two short members are used. For example, whereas FIG. 31 illustrates crossbar elements 3100, provided on the back surface 512 of the PV panel 104 (see FIG. 5), an alternate embodiment has only two short members 3104 spanning across the width of the back surface 512 without members 3102. In this alternate embodiment, a lip portion of the perimeter of the aluminum frame 516 (see FIG. 5) is removed and only the two cross elements 3104 are used to hold the PV panel in place; namely the bottom-most surface of the lip 3120 in FIG. 31 (e.g., the backmost surface that is in the plane of the PV panel). This modification serves to redistribute the material of the aluminum frame 516 to provide more efficient structural support and to be thermally active. Thus, in this embodiment the aluminum frame 516 enhances structural reliability and acts as a heat sink. The alternate embodiment showed a weight reduction of the PV panel 104 of approximately 4%-6.5%, and reduction of total deformation of the PV panel 104 by 68%-95%, respectively, compared to a comparative solar panel without this modification. The alternate embodiment may reduce the PV panel 104's temperature by 4° C.-9° C. during operation and produce 1.8%-4% higher power, compared to a structure without modification. In addition, the panel deformation was decreased by a 96% in the alternate embodiment, compared to the traditional model without replacement.

To this end, the present disclosure provides an efficient system 100 having a racking structure that simultaneously functions as a mechanical support and as a heatsink for passive cooling of the PV panels 104. From the above description, it will be understood that, unlike the conventional system where the purlins have no thermal contact with the PV panel, the system 100 of the present disclosure facilitates heat dissipation from the PV panel 104, thereby causing a maximum reduction of 6.3° C. in the temperature of the PV panel 104 and a maximum increase of 2.7% in power output. Further, from the experiments and comparisons with the conventional system, it is clear that the system 100 of the present disclosure significantly reduces the panel deflection and stresses against dynamic wind loads. The conventional system witnesses relatively high deformations and principal normal and shear stresses. In contrast, redistribution of the purlins in the system 100 of the present disclosure reduces the panel deformation by 86% and principal normal stress by 63% under pressure or suction wind loadings. As such, the system 100 of the present disclosure achieves significant economic and environmental implications. In the economic perspective, the system 100 eliminates use of expensive heat sinks that are normally used for panel cooling. The environmental benefit is justified by the reduction in panel wastage by enhanced service life and reduction in carbon footprint by the potential saving in material by avoiding heatsinks. These benefits become increasingly prominent in the present developments and promotional policies for the wide-spread implementation of PV-based power generation.

As used herein, the terms "a" and "an" and the like carry the meaning of "one or more."

Numerous modifications and variations of the present invention are possible in light of the above teachings. It is, therefore, to be understood that, within the scope of the appended claims, the invention may be practiced otherwise than as specifically described herein.

The invention claimed is:
1. A photovoltaic panel system, comprising:
a plurality of photovoltaic panels,
a plurality of purlins, and
a rigid support comprising at least two first vertical members each having a first vertical length, at least two second vertical members each having a second vertical length and at least two horizontal members each having a horizontal length L2,
wherein the first vertical length is less than the second vertical length and each horizontal member spans one of the first vertical members and one of the second vertical members to form a first support span, wherein a first horizontal member and a second horizontal member are oriented parallel to one another, and the photovoltaic panel system comprises at least two support spans;
wherein the plurality of purlins are connected to the first and second horizontal members of the rigid support to span the first and second horizontal members, and are oriented perpendicular to the first and second horizontal members,
wherein the plurality of purlins are oriented parallel to one another,
wherein the first vertical members and the second vertical members are oriented parallel to each other,
wherein each purlin has a respective flat bottom surface plate and a respective flat top surface plate that are lengthwise connected with a respective vertically oriented plate, resulting in a plurality of flat bottom surface plates and a plurality of flat top surface plates,
wherein in a cross section, each purlin is L-shaped and consists of the respective flat bottom surface plate, the respective flat top surface plate and the respective vertically oriented plate, wherein each flat bottom surface plate is directly adjacent to portions of top surfaces of the horizontal members;

wherein at least one of the plurality of photovoltaic panels has a length L1 and a width W1, wherein the L1>W1 and L1>L2;

wherein at least one of the purlins has a length L3 greater than the width W1;

wherein at least 6 purlins are evenly spaced along each of the at least two horizontal members; and wherein the respective flat top surface plate of each purlin is in thermal contact and in direct contact with a back surface of a respective photovoltaic panel of the plurality of photovoltaic panels.

2. The photovoltaic panel system of claim 1, wherein the purlins are evenly spaced at a distance of 200 mm to 270 mm apart.

3. The photovoltaic panel system of claim 1, wherein the first vertical members are spaced between 1.5 m and 2.5 m from one another, and the second vertical members are spaced between 1.5 m and 2.5 m from one another.

4. The photovoltaic panel system of claim 1, wherein each first vertical member is spaced between 1.0 m and 2.0 m from a second vertical member.

5. The photovoltaic panel system of claim 1, wherein:
each purlin of the plurality of purlins has a L-shaped cross section,
a respective narrow top edge of each purlin of the plurality of purlins is affixed to a respective photovoltaic panel of the plurality of photovoltaic panels, and
a respective wider bottom edge of each purlin of the plurality of purlins is exposed to atmosphere.

6. The photovoltaic panel system of claim 1, wherein the plurality of photovoltaic panels is evenly spaced on the purlins and each purlin is separated from a neighboring purlin by a distance of 0.1×W1 to 0.5×W1.

7. The photovoltaic panel system of claim 6, wherein each photovoltaic panel is fastened to a neighboring panel by a clamp having a first connection portion and a second connection portion; wherein the first and second connection portions are separated by a flat spacing element.

8. The photovoltaic panel system of claim 7, wherein the first connection portion and the second connection portion have a C-shaped cross section with a bottom portion in contact with a back surface of the at least one of the plurality of photovoltaic panels, a top portion in contact with a top surface of the at least one of the plurality of photovoltaic panels and a side section in contact with an edge of the at least one of the plurality of photovoltaic panels.

9. The photovoltaic panel system of claim 8, wherein a bolt traverses the flat spacing element of the clamp and a bottom surface of at least one purlin of the plurality of purlins to fasten the clamp and the plurality of photovoltaic panels to the photovoltaic panel system.

10. The photovoltaic panel system of claim 9, wherein the bolt is disposed at a midpoint between the first and second connection portions of the clamp.

11. The photovoltaic panel system of claim 1, wherein each photovoltaic panel comprises a frame mounted around a perimeter of the photovoltaic panel.

12. The photovoltaic panel system of claim 11, wherein each frame further comprises crossbar elements on the back surface of the photovoltaic panels.

13. The photovoltaic panel system of claim 12, wherein the crossbar elements include:
a long member spanning the length L1 of the at least one of the plurality of photovoltaic panels and comprising a top surface and a bottom surface; and
a short member spanning the width W1 of the at least one of the plurality of photovoltaic panels and comprising a top surface and a bottom surface.

14. The photovoltaic panel system of claim 13, wherein the long member and the short member intersect to form a common surface such that the top surface of the long member and the top surface of the short member are coplanar, and the bottom surface of the long member and the bottom surface of the short member are coplanar.

15. The photovoltaic panel system of claim 12, wherein the crossbar elements have a cross section in a shape of a "C" or an "I".

16. The photovoltaic panel system of claim 1, wherein the at least one of the plurality of photovoltaic panels comprises:
a first glass layer;
a first ethylene vinyl acetate (EVA) layer positioned below the first glass layer;
a layer of photovoltaic cells positioned below the first EVA layer;
a second EVA layer positioned below the layer of photovoltaic cells; and
a second glass layer positioned below the second EVA layer,
wherein the respective flat top surface plate of each purlin is in thermal contact and in direct contact with the second glass layer.

17. The photovoltaic panel system of claim 12, wherein the crossbar elements are of unibody construction.

18. The photovoltaic panel system of claim 1, wherein:
along a first direction parallel to the cross section, the respective flat top surface plate is aligned with the respective vertically oriented plate,
along a second direction parallel to the cross section, the respective flat bottom surface plate is wider than the respective flat top surface plate, and
the first direction is perpendicular to the second direction.

* * * * *